(12) United States Patent
Ohtomo et al.

(10) Patent No.: US 6,646,732 B2
(45) Date of Patent: Nov. 11, 2003

(54) POSITION DETERMINATION AND ADJUSTMENT SYSTEM AND LIGHT SENSING DEVICE USED FOR THE SAME

(75) Inventors: Fumio Ohtomo, Tokyo (JP); Kunihiro Hayashi, Tokyo (JP); Jun-ichi Kodaira, Tokyo (JP); Kazuki Osaragi, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/907,591

(22) Filed: Jul. 19, 2001

(65) Prior Publication Data

US 2002/0057426 A1 May 16, 2002

(30) Foreign Application Priority Data

Jul. 19, 2000 (JP) ........................................ 2000-218682

(51) Int. Cl.⁷ ............................................... G01B 11/26
(52) U.S. Cl. ................ 356/141.5; 356/141.1; 356/139.05; 359/159
(58) Field of Search .................. 356/139.04, 139.05, 356/141.1, 141.5, 141.4; 359/159

(56) References Cited

U.S. PATENT DOCUMENTS

| | | | |
|---|---|---|---|
| 4,218,834 A | * | 8/1980 | Robertsson |
| 4,441,809 A | | 4/1984 | Dudley et al. |
| 4,764,982 A | * | 8/1988 | Pfund |
| 5,100,229 A | | 3/1992 | Lundberg et al. |
| 5,110,202 A | | 5/1992 | Dornbusch et al. |
| 5,742,387 A | | 4/1998 | Amman |
| 5,767,960 A | * | 6/1998 | Orman ................... 356/139.03 |
| 6,219,133 B1 | * | 4/2001 | Kawase et al. ......... 356/139.04 |
| 2002/0008870 A1 | * | 1/2002 | Beliveau et al. |

FOREIGN PATENT DOCUMENTS

| | | | |
|---|---|---|---|
| DE | 19540590 | 4/1996 | |
| EP | 0854351 | 7/1998 | |
| GB | 2090096 | 6/1982 | |
| JP | 6-26861 | 2/1994 | ............ G01C/5/00 |
| JP | 7-9208 | 8/1995 | ............ G01C/5/00 |
| JP | 11-8487 | 4/1999 | ............ G01C/5/06 |
| JP | 11-94544 | 4/1999 | ............ G01C/5/00 |

* cited by examiner

Primary Examiner—Stephen C. Buczinski
(74) Attorney, Agent, or Firm—Jacobson Holman PLLC

(57) ABSTRACT

A position determining system is disclosed, which has a simplified configuration capable of producing a plurality of phantom planes simultaneously. The improved system according to the present invention consists of a light receiving and sensing device that includes a body having means for sending data on elevation- and depression-angles and horizontal angles, and a phantom plane determining function for determining phantom planes, so as to display or output differential angles of elevations and depressions in relation with the phantom surfaces produced from the data received from the body.

8 Claims, 21 Drawing Sheets

(a)

(b)

(c)

(a)

(b)

POSITION DETERMINATION AND ADJUSTMENT SYSTEM AND LIGHT SENSING DEVICE USED FOR THE SAME

FIELD OF THE INVENTION

The present invention relates to a position determination and adjustment system in which a laser source is rotated while emitting laser beam, so as to produce an inclined plane making a certain inclination angle from a horizontal reference plane, and it also relates to a light sensing device used for the system. The position determination and adjustment system according to the present invention allows for creating a reference point, a reference line, and a reference plane for measurements.

PRIOR ARTS

Prior art optical leveling apparatuses have been replaced with rotary laser devices used to produce a horizontal reference level covering a relatively large range.

For recent years, rotary laser devices have become popular in use for determining vertical orientations, especially, for creating lines and planes based upon reference elevations. Such rotary laser devices, while emitting laser beam in horizontal directions, rotates, reciprocally sweeps, and halts to produce reference planes of rotations, partial reference lines, reference planes, reference segments, reference points, and the like.

The rotary laser devices have been used to produce reference horizontal lines for the purpose of localization of window frames in interior constructions for buildings, and to produce reference horizontal planes for making mounts in construction sites and simulating sectional surfaces after cutting the grounds off. The rotary laser devices have also been used to set up reference points in determining inclinations for stairs, and some of those devices can produce reference planes inclined in one way or in two ways.

One of such prior art rotary laser devices capable of producing inclined reference surfaces is disclosed in Japanese Patent Laid-Open No. H6-26861, and the configuration and operation of the disclosed rotary laser device will now be summed up.

Referring to FIG. 24, a rotary laser device 951 has a casing 901 and a laser projector 903. The casing 901 has its upper center portion recessed in a shape of a frustum of a cone to define a concave portion 902. The laser projector 903 vertically extends through the center of the concave portion 902. The laser projector 903 supported by the recessed portion 902 can be tilted on and around a spherical mount 904 formed in the middle thereof. A rotary unit 905 provided with a pentaprism 909 is mounted in an upper portion of the laser projector 903. The rotary unit 905 is rotated through a drive gear 907 and sweep gear 908 powered by a sweep motor 906.

Two pairs of units of inclination mechanism (only one of the pairs is illustrated) are attached around the laser projector 903. Either of the units 910 of the inclination mechanism includes a motor 911, a screw 912, and a nut 913 that are all cooperative to make inclination. The screw 912 is rotated through a driving gear 914 and a tilting gear 915 both powered by the motor 911. The laser projector 903 is coupled to the nut 913 by a tilting arm 916 intervening therebetween. Rotations of the screw cause the nut 913 to vertically move, which, in turn, causes the laser projector 903 to tilt.

Two sensors 918 and 919 are located and separately fixed to the laser projector 903 in the middle thereof in a plane orthogonal to a rotation axis of the rotary unit 905. One of the fixed sensors, the sensor 918, is positioned in parallel with the tilting arm 916 while the other, the sensor 919, is oriented orthogonal to the tilting arm 916. A flange 920 having a pivot pin 921 is fixed to a lower end of the laser projector 903. An upper end of the pivot pin 921 pivotally supports an L-shaped tilting plate 922 at one point thereon, and an angle-determining sensor 929 and an angle-determining sensor 930 are incorporated in the L-shaped tilting plate 922. The angle-determining sensor 929 is positioned in the same direction as the fixed sensor 918 while the angle-determining sensor 930 is positioned in the same direction as the fixed sensor 919. The tilting plate 922 is connected to both the pairs of the units of inclining mechanism (only one unit is shown).

Each of the units 925 of inclining mechanism includes a motor 926, a screw 927 rotated by the motor 926, and a nut block 928 through which the tilting screw 927 is screwed down, all of these components being cooperative to make a reference to inclination angle. One end of the tilting plate 922 is fitted on the nut block 928. The motor 926 is actuated to rotate the screw 927 and vertically move the nut block 928, and thus, the tilting plate 922 can be inclined.

A laser beam projector (not shown) and a projector optical system (not shown) including optics such as a collimator lens that refracts incident rays from the laser beam projector into parallel rays are built in the laser projector 903. Laser beam emitted from the projector optical system is deflected in horizontal direction by the pentaprism and radiated out of a projector window 931.

Functional features of the rotary laser device will now be described. Determination of an inclination angle is carried out by the inclining mechanism 925. First, the inclination mechanism 910 is actuated to regulate postures of the fixed sensors 918 and 919 so that both of the sensors are horizontal. The motor 926 is then actuated to rotate the screw 927 and lift the nut block 928, and consequently, the tilting plate 922 is inclined at an angle η relative to the flange 920 in a reverse angular direction to the desired predetermined angle η. The inclination angle η is detected by a component such as an encoder (not shown) linked to the motor 926.

Then, the inclination mechanism 910 is actuated to tilt the laser projector 903 so that the tilting plate 922 is detected as being horizontal. At this posture, an emission direction of light from the laser projector 903 inclines at the predetermined angle η relative to the horizontal plane. After the inclination angle in the emission direction of the laser light is determined, the laser beam deflected at the pentaprism 909 in a direction orthogonal to the rotation axis is radiated through the laser projector 903 while the rotary unit 905 is being rotated or the rotary unit 905 is reciprocally sweeping within a range equivalent to the predetermined angle, so as to produce an inclined reference plane.

Japanese Patent Laid-Open No. H11-94544 discloses a post-construction elevation display apparatus and a post-construction elevation determining apparatus both of which are comprised of a laser device rotating simultaneous with irradiating laser beam and a finished elevation display. The post-construction elevation determining apparatus can determine a desired post-construction elevation by using the post-construction elevation display to receive laser beam irradiated by the laser device so as to detect a distance from the laser device to the display device and a deviation between the display device and a reference horizontal plane against which the laser beam is directed.

Furthermore, Japanese Patent Laid-Open No. H11-118487 discloses a reference irradiated beam detecting apparatus incorporated with an inclination angle sensor, which is used in combination with a laser device.

Additionally, Japanese Patent Laid-Open No. H7-208990 discloses a 3-dimensional coordinate determining apparatus including an irradiating means rotating and irradiating a plurality of plane beams and more than one reflecting means. The 3D coordinate determining means uses the plurality of reflecting means to reflect light emitted from the irradiating means and uses the irradiated means to receive the reflected beams to determine 3-dimensional coordinates in relation with the reflecting means.

The prior art rotary laser device as in the above statement must have two pairs of units of inclining mechanism which support the laser projector 903 in a manner where the laser projector can have a full freedom of tilting in two ways, in order to produce inclined planes. Such prior art embodiment is disadvantageous in that it needs two of the fixed sensors 918 and 919 and two of the tilting sensors 929 and 930 and in that it requires a complicated configuration, i.e., it needs a control circuit to control an actuation of two of the pairs of the units of inclining mechanism, which results in an increased manufacturing cost. Moreover, the prior art rotary laser device disadvantageously produces only one reference plane but can never produce horizontal and inclined reference planes simultaneously, which disturbs determining a relative relation between the horizontal and inclined reference planes, or which disturbs determining a relative relation between two inclined reference planes different in inclination angle from each other.

The prior art embodiment of the 3-dimensional coordinate determining device as disclosed in Japanese Patent Laid-Open No. H7-208990 should be further improved by accurately regulating an angular position of the reflecting means so as to return beams reflected from the reflecting means to the irradiating means. Additionally, the reflecting means must be moved in producing the predetermined reference plane, and a determination value also must be monitored at the irradiation means, which disadvantageously results in requesting more than one operators to dedicate themselves in handling the device.

In order to overcome the aforementioned disadvantage, the present invention provides an improvement of a position determining system by which both a plane of arbitrary inclination and a horizontal reference plane of arbitrary elevation can be simultaneously determined without tilting a laser projector and without precisely locating a light receiving element.

Accordingly, it is an object of the present invention to provide a position determining system of a simplified mechanism that is capable of producing a horizontal reference plane and a plurality of inclined planes simultaneously.

It is another object of the present invention to provide a position determining system of simplified operation which permits a single operator to work sufficiently.

It is still another object of the present invention to provide a light receiving and sensing device of a simplified mechanism that is capable producing a horizontal reference plane and an inclined reference plane simultaneously.

SUMMARY OF THE INVENTION

The present invention is an improved system consisting of a light receiving and sensing device and a rotary laser device, wherein the rotary laser device includes a body having means for sending data on vertical angles and horizontal angles, and wherein the light receiving and sensing device includes a phantom plane determining function for determining phantom planes, so as to display or output differential vertical angles in relation with the phantom surfaces produced from the data received from the body.

The means for sending data on vertical angles is preferably laser light pivotal and diverging in a shape of a fan, and the means for sending data on horizontal angles is preferably configured with an encoder provided in a rotary element and a data transfer route aided by a communication means that relays the data detected by the encoder to the light receiving and sensing device.

The communication means is preferably an optical communication or a wave communication.

A light receiving section in the light receiving and sensing device may have a versatility of serving as either a vertical detecting element or a light receiving element for optical communication, and the light receiving section may have a condensing means.

Also preferably, the fan-shaped laser light is substantially of 3 or more fan-shaped rays, and the pivotal fan-shaped laser light of the means for sending data on vertical angles is correlated with the data transmitted from the encoder to the light receiving and sensing device for subsequent data transfer.

With the system thus configured, the fan-shaped beams emitted from a rotary laser device are received by the light receiving section in the light receiving and sensing device, and vertical angles of a location where the light receiving and sensing device is placed is computed from delays between points of time when the fan-shaped beams are detected. Moreover, a rotational angular position transfer means provided in the rotary laser device transfers data on rotational angular positions to a receiving element of the light receiving and sensing device, and then, the light receiving and sensing device computes the location of the light receiving and sensing device from the rotational angular positions.

BRIEF DESCRIPTION OF THE DRAWINGS

The best mode of the present invention will be explained in detail in conjunction with the accompanying drawings in which like alphanumeric symbols denote the corresponding elements and parts throughout the drawings.

DETAILED DESCRIPTION OF THE INVENTION

A position determining system according to the present invention will now be described in more detail with reference to the drawings.

(1) Preferred Embodiment 1

Figure 1:
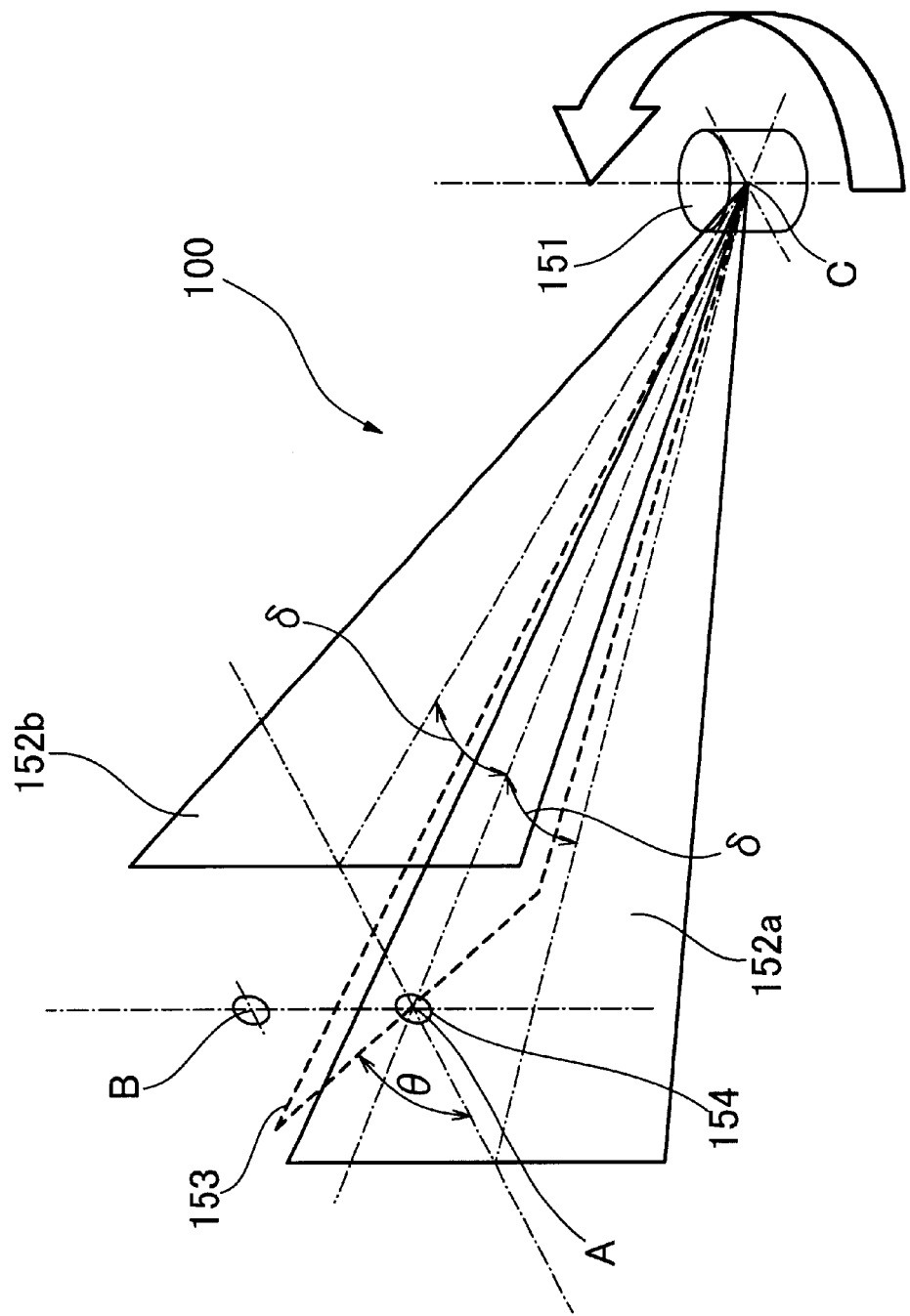
FIG. 1 is a schematic perspective view showing an embodiment of a position determining system according to the present invention.
Figure 2:
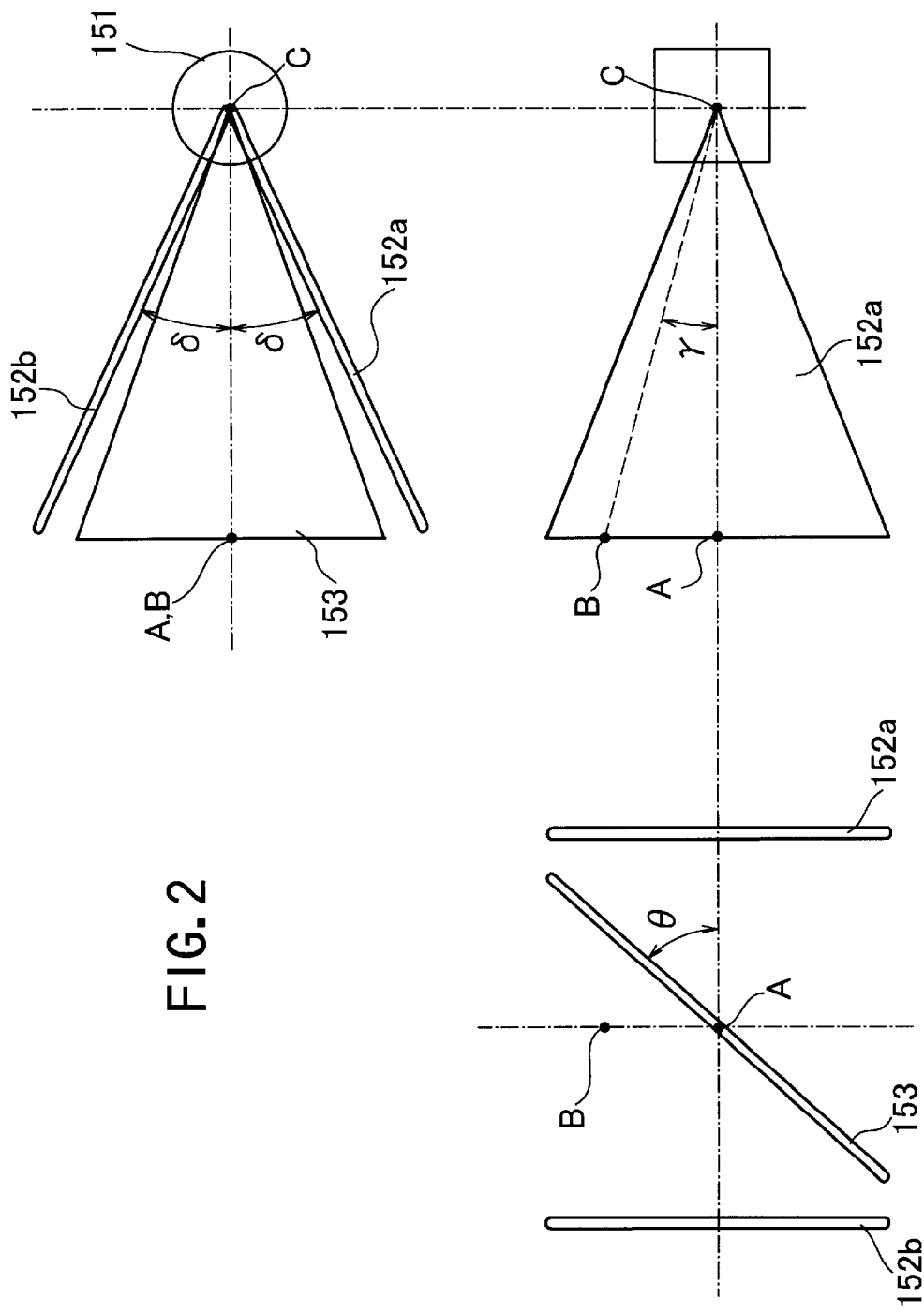
FIG. 2 is a view illustrating beams diverging in three-dimensional space after being emitted from a rotary laser device in the exemplary position determining system according to the present invention.

First, a configuration of the position determining system according to the present invention will be outlined. As shown in FIG. 1, a position determining system 100 of the present invention includes a rotary laser device 151 and a light receiving and sensing device 154. The rotary laser device 151 emits three fan-shaped laser beams, 152a, 152b, and 153, while rotating the fan-shaped beams about a point C. As can be seen in FIG. 2, the fan-shaped beams 152a and 152b are emitted in an orthogonal direction to the horizontal plane while the fan-shaped beam 153 is emitted at an angle θ with the horizontal surface. A cross line of the fan-shaped beam 153 with the horizontal plane bisects an angle at which the fan-shaped beams 152a and 152b meet. In other words, an angle made between the cross line and the fan-shaped beam 152a is equivalent to an angle made between the cross line and the fan-shaped beam 152b, being expressed as δ by way of reference. The three beams 152a, 152b, and 153 rotate, keeping such relations with one another, and therefore, the fan-shaped beams 152a, 152b, and 153 cross a light receiving and sensing device one after another with time delay. The embodiment of the invention utilizes the time delay to determine a straight line on both the light receiving and sensing device and the point C, and an angle γ made between the straight line and the horizontal plane. The angle γ herein is referred to as "vertical angle".

(1. 2) Rotary Laser Device (1. 2. 1) Rotary Laser Device Emitting Three fan-shaped Beams of Laser Light A rotary laser device will now be described, which rotates about a vertical axis while emitting three fan-shaped beams of laser light.

Figure 3:
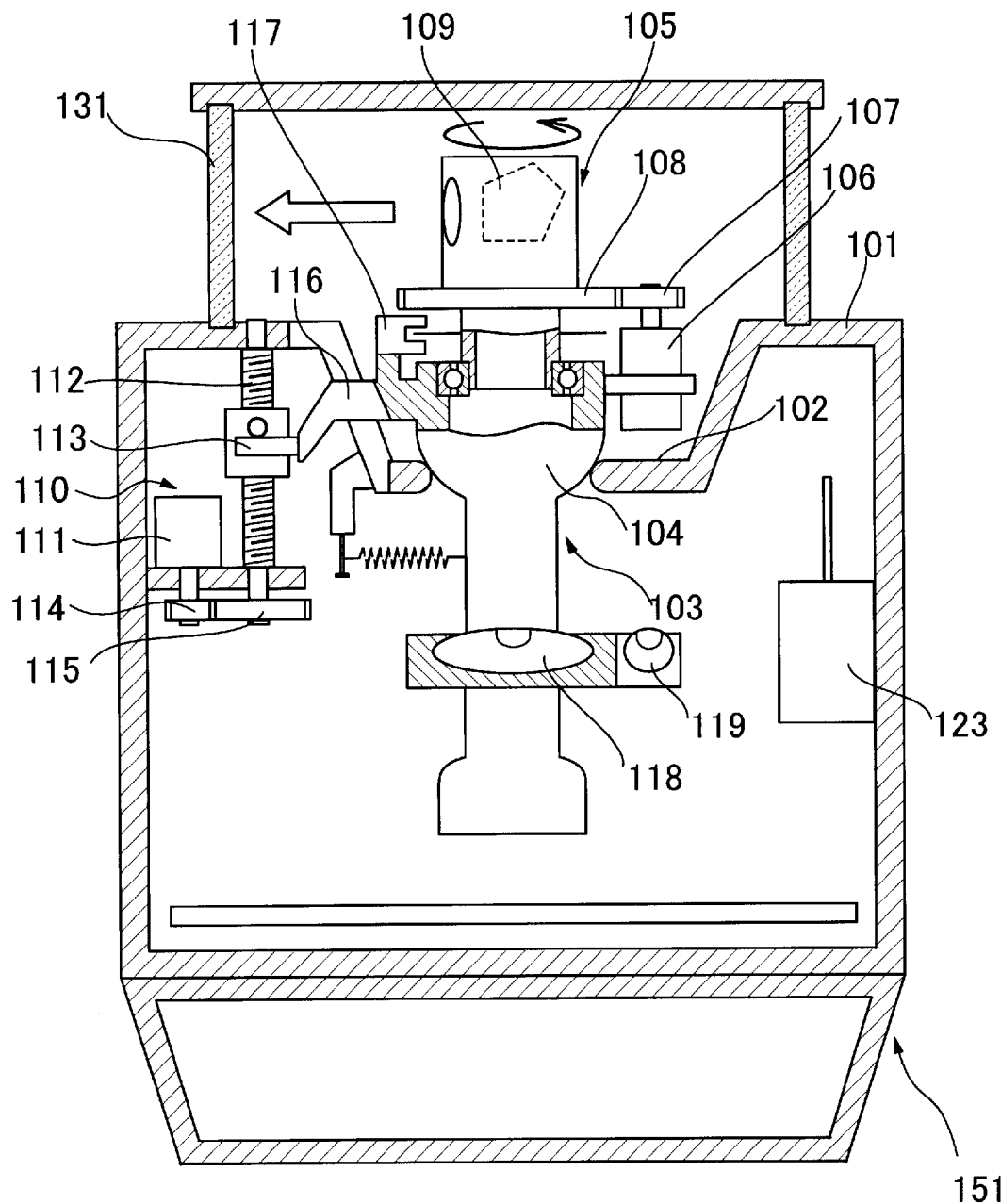
FIG. 3 is a sectional view showing the exemplary position determining system according to the present invention.

Referring to FIG. 3, a rotary laser device 151 according to the present invention has a casing 101 and a laser projector 103. The casing 101 is recessed in a shape of a frustum of a cone at the center of its upper surface to define a concave portion 102. The laser projector 103 vertically extends through the center of the concave portion 102. The laser projector 103 supported by the recessed portion 102 can be tilted on and around a spherical mount 104. A rotary unit 105 provided with a pentaprism 109 is mounted in an upper portion of the laser projector 103. The rotary unit 105 is rotated through a drive gear 107 and sweep gear 108 powered by a sweep motor 106.

The rotary laser device 151 has two pairs of units of inclination mechanism (only one of the pairs is illustrated) that are attached around the laser projector 103. Either of the units 110 of the inclination mechanism includes a motor 111, a screw 112, and a nut 113 that are all cooperative to make inclination. The screw 112 is rotated through a driving gear 114 and a tilting gear 115 both powered by the motor 111. The nut 113 is coupled to the laser projector 103 by a tilting arm 116 intervening therebetween. Rotations of the screw cause the nut 113 to vertically move, which, in turn, causes the laser projector 103 to tilt. The other of the pairs not shown in the drawing uses a similar manner to the above-mentioned one of the units 110 and tilts the projector 103 in a direction perpendicular to the inclination direction of the above-mentioned unit.

A fixed sensor 118 in parallel with the tilting arm 116 and a fixed sensor 119 orthogonal to the tilting arm 116 are located in the middle of the laser projector 103. One of the units 110 of the inclination mechanism controls a tilt of the tilting arm 116 to always keep the fixed sensor 118 in horizontal orientation. Similarly, at the same time, the other of the units 110 can control the fixed sensor 119 to permanently keep its horizontal orientation.

Figure 4:
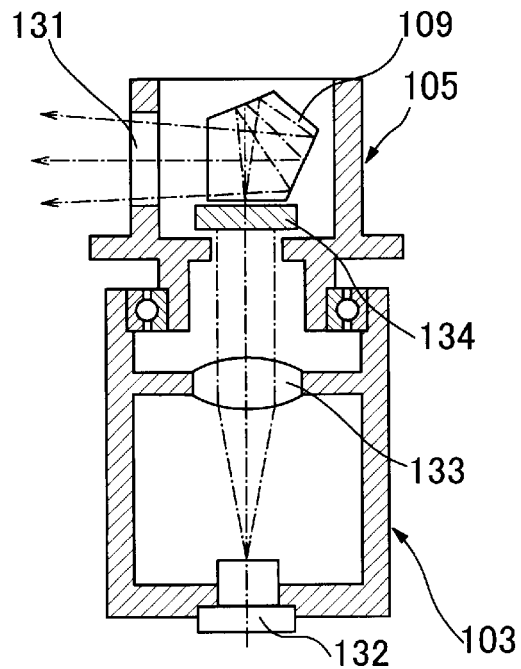
FIG. 4 is a diagram showing another embodiment of the rotary laser device in the position determining system according to the present invention.

The laser projector 103 and the rotary unit 105 will now be described. As will be recognized in FIG. 4, a laser beam projector 132 and a projector optical system including optics such as a collimator lens 133 that refracts incident rays from the laser beam projector 132 into parallel rays are built in the laser projector 103. Laser beam emitted from the projector optical system is split into three fan-shaped beams, 152a, 152b, and 153, by a diffraction grating (BOE) 134 in the rotary unit 105. The fan-shaped beams 152a, 152b, and 153 are respectively deflected in horizontal direction by pentaprism and radiated out of a projector window 131.

Figure 5:
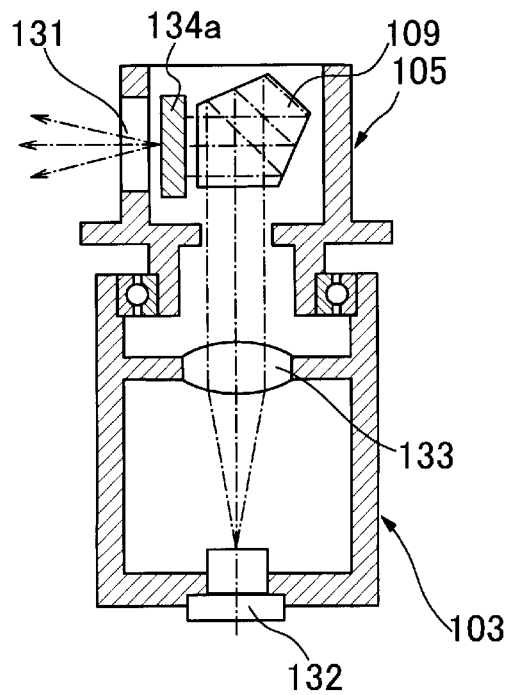
FIG. 5 is a diagram showing still another embodiment of the rotary laser device of the position determining system according to the present invention.

As shown in FIG. 5, a diffraction grating (BOE) 134a may be placed in a position at which laser beam is transmitted after being deflected by the pentaprism 109. Such a configuration as depicted in FIG. 5 is identical that depicted in FIG. 4 except for a location of the diffraction grating 134a.

Figure 6:
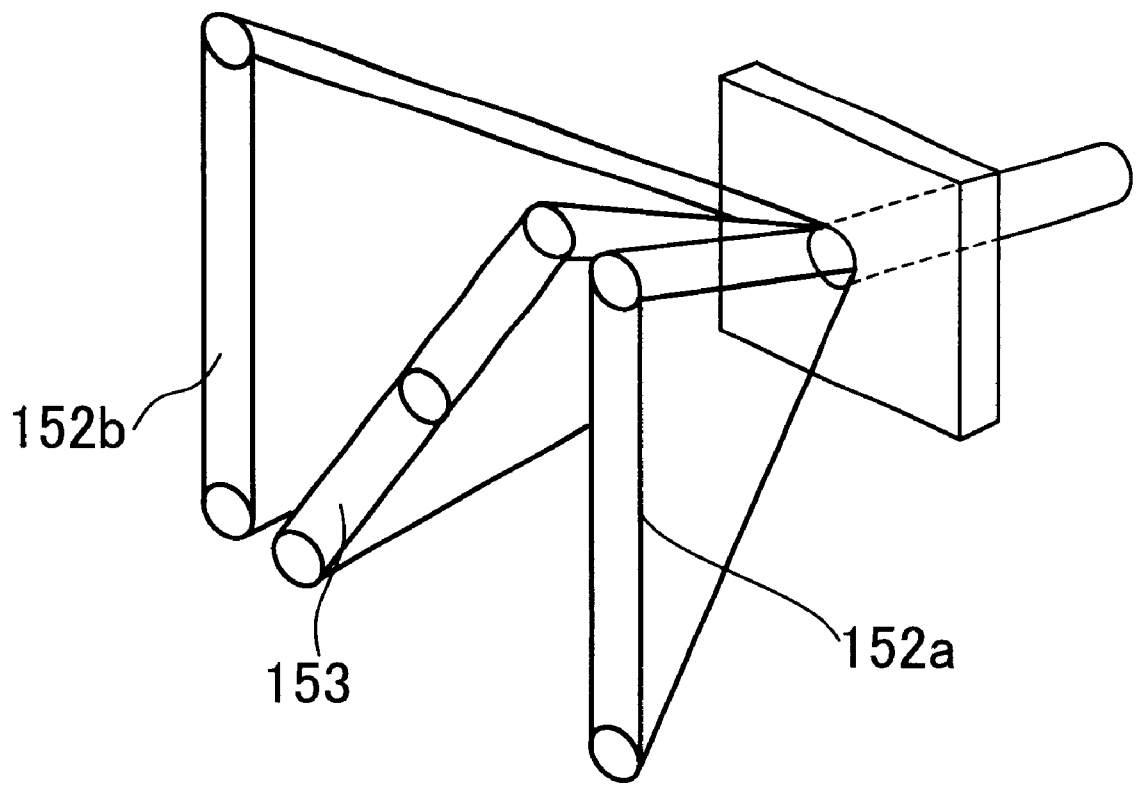
FIG. 6 is a diagram showing a manner in which laser beam transmitted by diffraction grating is converted into fan-shaped beams.

As can be seen in FIG. 6, the laser beam, after transmitted by the diffraction grating (BOE) 134, is split into the three fan-shaped beams 152a, 152b, and 153.

As has been stated, the laser projector 103 irradiates laser beams that are originally emitted from the laser light projector 132 and then split into the three fan-shaped beams 152a, 152b, and 153 by the diffraction grating (BOE) 134. The laser beams are respectively deflected in a horizontal direction by the pentaprism 109 while the rotary unit 105 is being rotated, so as to produce a reference plane.

(1. 2. 2) Rotary Laser Device Emitting Three Fan-shaped Laser Beams Different in Polarization An alternative rotary laser device will now be described, which emits three fan-shaped laser beams different in polarization from one another.

Figure 7:
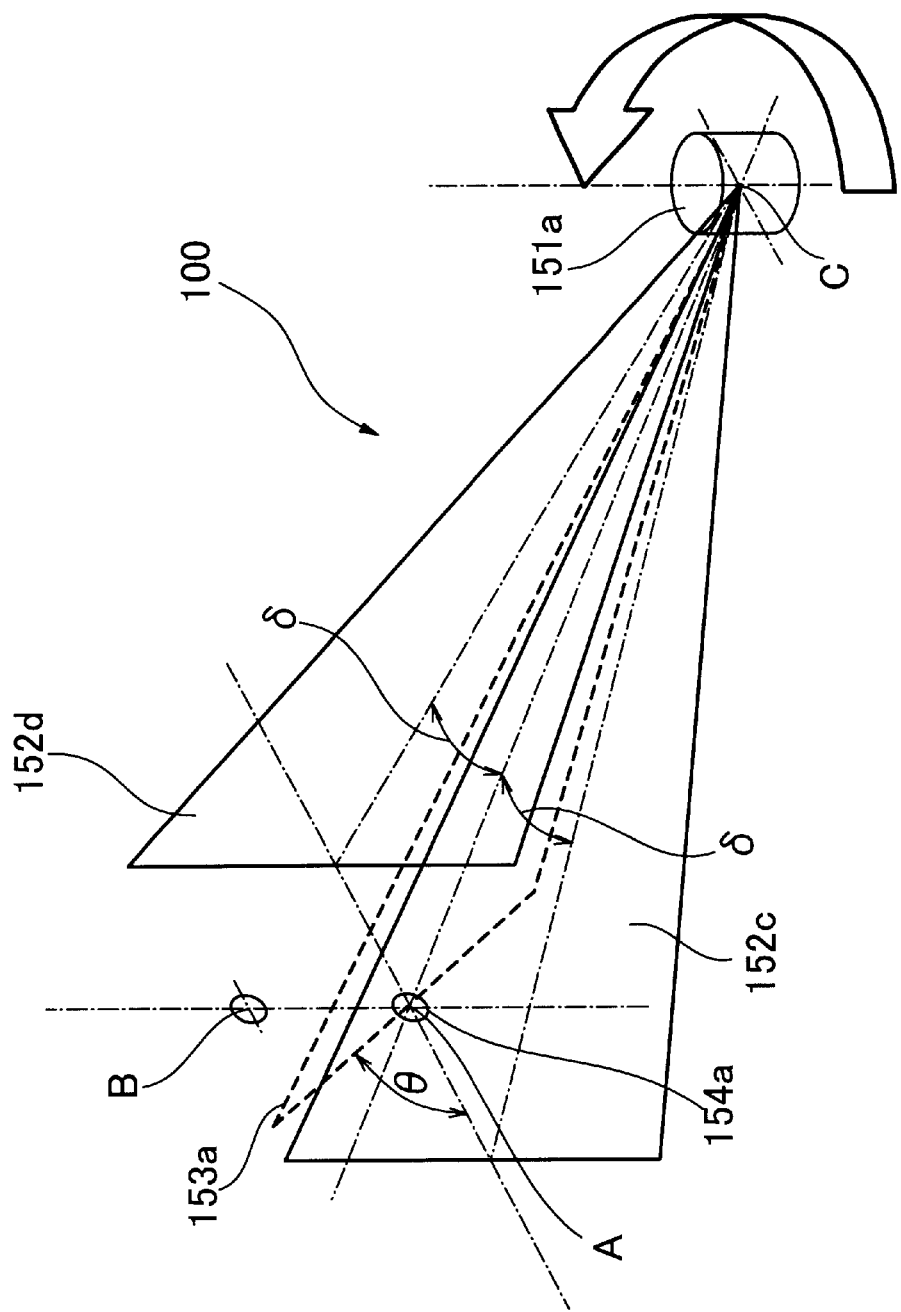
FIG. 7 is a perspective view showing an embodiment of the rotary laser device that irradiates fan-shaped beams varied in polarization.

As will be detailed hereinafter, in order to attain a position determination with high accuracy, it is advantageous to use a rotary laser device that emits three fan-shaped laser beams having their respective polarization patterns different from one another. As shown in FIG. 7, a rotary laser device 151 a emits three fan-shaped beams 152c, 152d, and 153a. Three of the fan-shaped beams 152c, 152d, and 153a are polarized in manners varied from one another, and thus, the light receiving section of the light receiving and sensing device 154a can distinguish those three fan-shaped beams 152c, 152d, and 153a one from the other.

Figure 8:
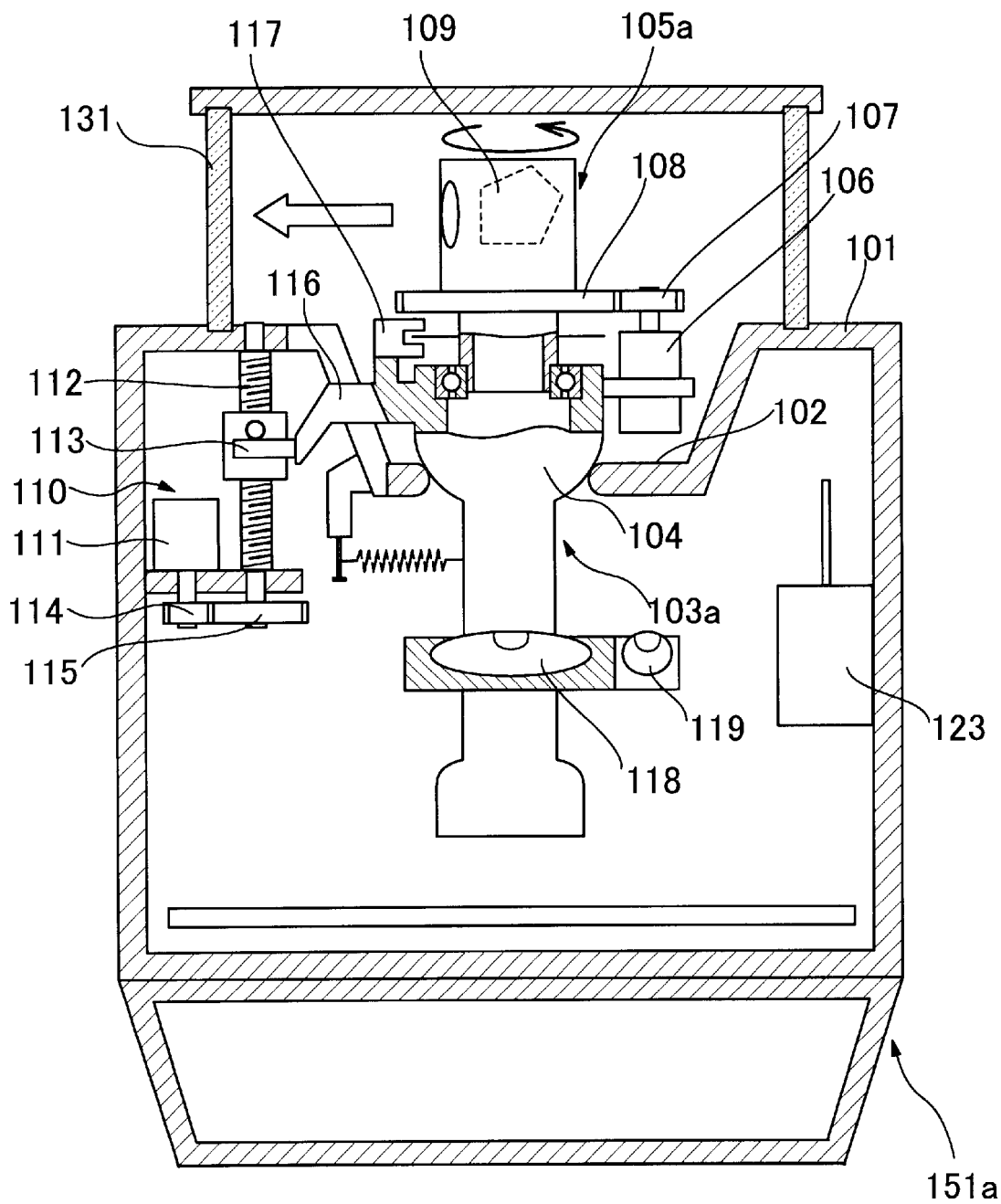
FIG. 8 is a sectional view showing the rotary laser device which emits fan-shaped beams varied in polarization.

As shown in FIG. 8, a mechanism used to tilt the laser projector components are all identical with those depicted in FIG. 3 except for a laser projector 103a and a rotary unit 105a attached thereto both of which are built in the rotary laser device 151a. For convenience of description, the laser projector 103a and the rotary unit 105a alone will be explained below.

Figure 9:
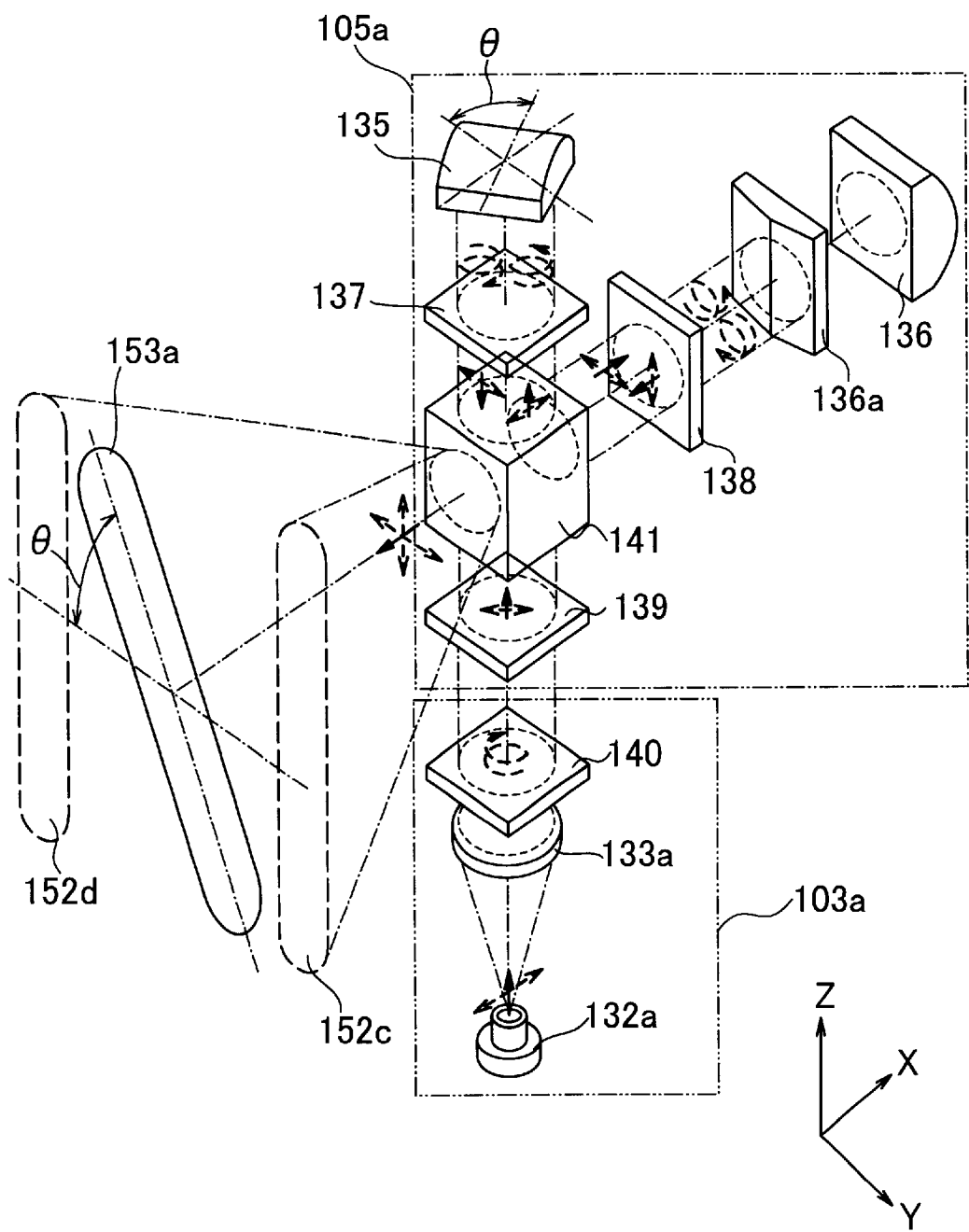
FIG. 9 is an exploded view illustrating a laser projector and rotary section of the rotary laser device which emits fan-shaped beams varied in polarization.

With reference to FIG. 9, the rotary laser device 151 a emitting the fan-shaped beams 152c, 152d, and 153a of different polarizations includes the laser projector 103a and the rotary unit 105a. Directions of the laser beams passing through each optical element in the drawing are shown by arrows of solid lines while polarization directions of the laser beams are shown by arrows of broken lines.

When laser diode is used for the laser beam projector 132a in the laser projector 103a, the resultant laser beam polarizes linearly. Assume that the laser beam is polarized in X-direction and is emitted in Z-direction, and that a direction perpendicular to an X-Z plane is Y-direction. The laser beam emitted from the laser beam projector 132a is collimated by a collimator lens 133a to be directed at a quarter-wave plate 140. The quarter-wave plate 140 is oriented so that the laser beam emitted from the laser beam projector 132a and linearly polarized in the X-direction is circularly polarized. After transmitted by the quarter-wave plate 140, the laser beam is passed through another quarter-wave plate 139 and linearly deflected in a direction meeting at an angle of 45 degree with the X-direction, as illustrated in FIG. 9. Since the rotary unit 105a is rotatably supported, the quarter-wave plates 140 and 139 vary in their relative positions. However, as the laser light passing through the quarter-wave plate 140 is circularly deflected beam, such beam after passing through another quarter-wave plate 139 is not influenced by variations in the relative positions of the quarter-wave plates, but a direction of the linear deflection of the beam is determined merely by the quarter-wave plate 139. Then, the laser beam is passed through a polarized-beam splitter 141. The polarized-beam splitter 141 is configured so as to reflect components deflected in the Y-direction while transmitting components deflected in the X-direction. Thus, the laser beam linearly deflected by the quarter-wave plate 139 in the direction making the angle of 45 degree with the X-direction has its Y-directional components reflected by the polarized-beam splitter 141 and deflected by an angle of 90 degree and has its X-directional components transmitted by the polarized-beam splitter 141.

The laser beam reflected by the polarized-beam splitter 141 is incident upon still another quarter-wave plate 138 to be circularly deflected, and thereafter, it is reflected by a cylinder mirror 136. The cylinder mirror 136 is oriented in such a manner that the laser beam is orthogonal to the horizontal plane when emitted from the rotary unit 105a. Also, a declination prism 136a is placed between the quarter-wave plate 138 and the cylinder mirror 136. The declination prism 136a is bisected at its center and has a transmission declination prism that develops an angle 2δ between fan-shaped beams 152c and 152d emitted by the rotary unit 105a. The laser beam reflected by the cylinder mirror 136 is transmitted again by the declination prism 136 and the quarter-wave plate 138 to be linearly polarized in the Z-direction, and hence, this time, the beam can be transmitted by the polarized-beam splitter 141 to be emitted out of the rotary unit 105a.

On the other hand, the laser beam transmitted thorough the polarized-beam splitter 141 is incident upon further another quarter-beam splitter 137 to be circularly polarized and then is reflected by a cylinder mirror 135. The cylinder mirror 135 is oriented in such a manner that the laser beam meets the horizontal plane at an angle θ when emitted from the rotary unit 105a. Since the laser beam reflected by the cylinder mirror 135 is transmitted again by the quarter-wave plate 137 to be linearly polarized in the Y-direction, the polarized beam is reflected by the polarized-beam splitter 141 that has transmitted it upon entrance to a path toward the rotary unit, and the reflected beam is emitted out of the rotary unit 105a.

(1. 2. 3) Unit for Determining a Rotational Angular Position of the Light Receiving and Sensing Device Relative to the Rotary Laser Device Now, described below will be a rotational angular position determining unit which is used to determine a rotational angular position of the light receiving and sensing device 154a relative to the rotary laser device 151a, or to determine which rotational angular position the light receiving and sensing device 154a is positioned in circular tracks at which the rotational laser device 151a direct laser light. The rotational angular position determining unit described herein can also be combined with the aforementioned rotary laser device 151 in the similar manner.

The rotary laser device 151a includes, as illustrated in FIG. 8, an emission direction detecting means such as an encoder 117 detecting an angle of emitted laser beam and an angle signal transmitter 123 transmitting the detected emission angle to the light receiving and sensing device 154a. The encoder 117 detects an angle of beam emission from the rotary unit 105a. Data on the detected emission angle is successively sent to the light receiving and sensing device 154a by the angle signal transmitter 123.

Combined with the rotary laser device 151 shown in FIG. 3 for the laser projector 103 (see FIG. 5), an embodiment shown in FIG. 10(a) can determine a rotational angular position of the light receiving and sensing device 154. In such an embodiment, an angle signal projector 172 is used, which modulates light emitting diode (LED) or laser diode varied in wavelength (color) from the fan-shaped beams 152a, 152b, and 153a to project light representing angular data onto the light receiving and sensing device 154.

Referring to FIG. 10(a), the laser beam emitted from the angle signal projector 172 is reflected at a die clock prism 171 and then collimated by the collimator lens 133 to adjust beam angles so that the resultant beam covers the entire range of diversion made by the fan-shaped beams 152a, 152b, and 153. The beam transmitted through the collimator lens 133 is transmitted by the pentaprism 109 and then reflected at a mirror 148 to be emitted out of the rotary unit 105 in a direction orthogonal to a rotation axis thereof. Laser beam 153e (see FIG. 10a(b)) has its rotational angular position determined by directing the beam at the light receiving and sensing device. A method of receiving the laser beam 153e to determine rotational angular positions will be explained later.

A beam emitted from the laser beam projector 132 is transmitted through the die clock prism 171 and collimated by the collimator lens 133. The collimated beam is reflected by a die clock mirror 149 and deflected by the pentaprism 109. The deflected light is passed through the diffraction grating 134 and split into three fan-shaped beams 152a, 152b, and 153.

Figure 11:
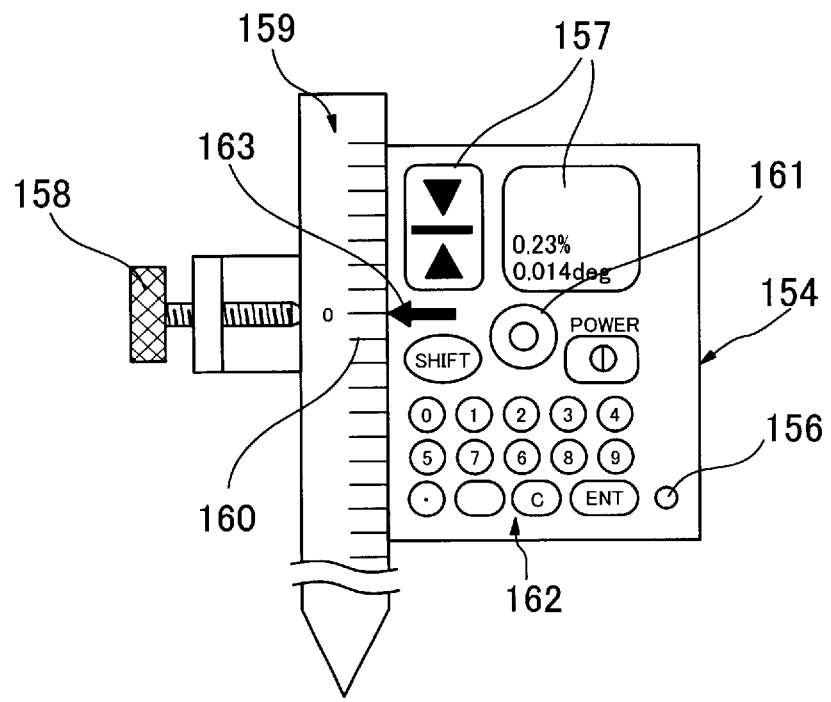
FIG. 11 is a view illustrating a light receiving and sensing device in an embodiment of the position determining system according to the present invention.
Figure 12:
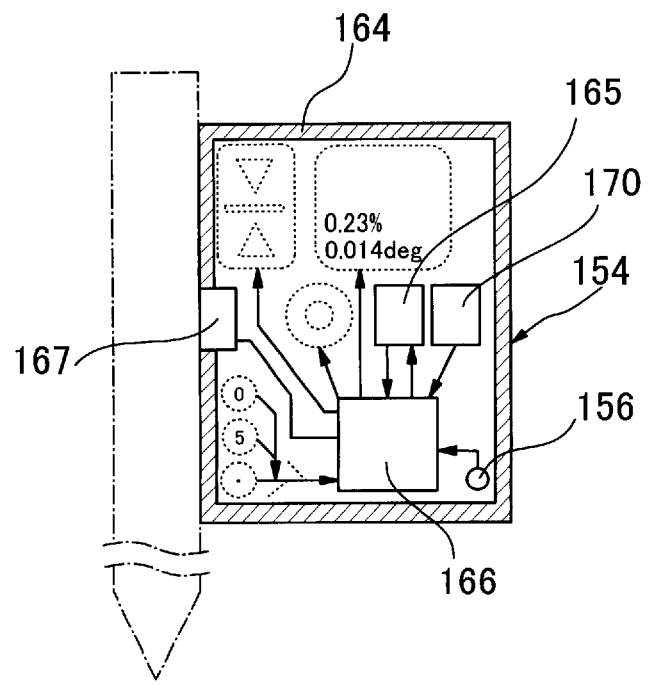
FIG. 12 is a diagram showing the inside of the light receiving and sensing device.

(1. 3) Light Receiving and Sensing Device
(1. 3. 1) Light Receiving and Sensing Device for the Rotary Laser Device That Emits Three Fan-shaped Beam of Laser Light The light receiving and sensing device 154 will now be described which receives the fan-shaped beams 152a, 152b, and 153 emitted from the rotary laser device 151. As shown in FIGS. 11 and 12, a box housing 164 of the light receiving and sensing device 154 is provided with a light receiving section 156 used to detect the fan-shaped beams 152a, 152b, and 153. The box housing 164 includes a display 157, a warning unit 161 such as a buzzer, input keys 162, an index 163, and a level rod 159. The box housing 164 is incorporated with a memory 165, a computation unit 166, a scale reader 167 for the level rod, and an angle signal receiver 170. The display 157 indicates information including an angle between a straight line joining a rotation center C of the laser beam and the light receiving section 156 and a rotational angular position of the light receiving and sensing device 154 relative to the rotary laser device 151.

(1. 3. 1. 1) Principle of Angle Determination by the Light Receiving and Sensing Device As mentioned above, the rotary laser device 151 emits the fan-shaped beams 152a, 152b, and 153 in a pivotal manner. As illustrated in FIG. 2, the fan-shaped beam 153 is emitted, meeting at an angle θ with the horizontal plane. A cross line of the fan-shaped beam 152a with the horizontal plane and a cross line of the fan-shaped beam 152b with the horizontal plane meet at an angle 2δ Three of the fan-shaped beams 152a, 152b, and 153 rotate, keeping such relations with each other, and therefore, those beams cross the light receiving section 156 of the light receiving and sensing device 154 at a delay of time one after another in the order of the fan-shaped beams 152a, 153, and 152b.

Figure 13:
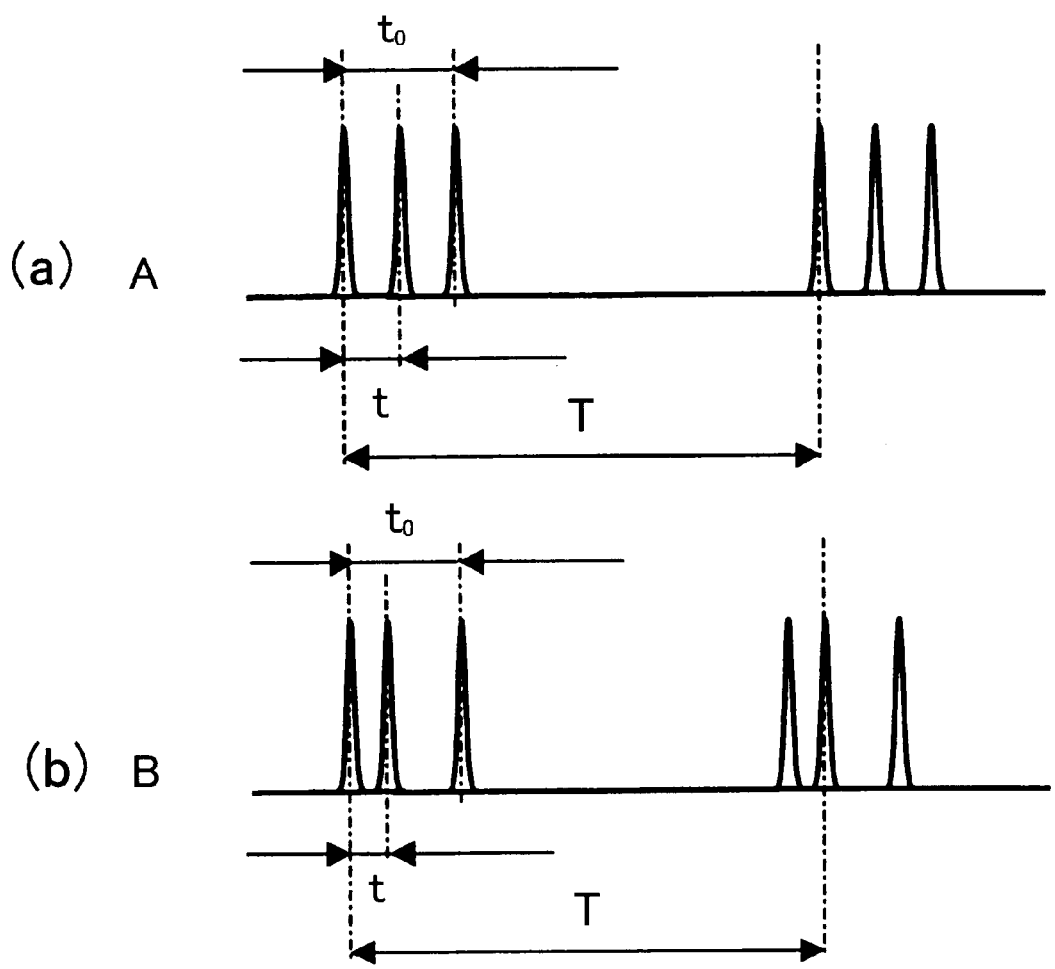
FIG. 13 is a graph showing signals detected by the light receiving and sensing device.

When the light receiving section 156 of the light receiving and sensing device 154 is in a position A within the horizontal plane, light detected by the light receiving and sensing device 154 is indicated as in FIG. 13(a). When the light receiving section 156 is in a position B vertically right above the position A, the detected fan-shaped beam is indicated as in FIG. 13(b). As can be seen in FIG. 13(a), two of the fan-shaped beams 152a and 152b are detected at time interval to. Assume now that a time delay between detections of the fan-shaped beam 152a and the fan-shaped beam 153 is t. When the light receiving section 156 is in the position A within the horizontal plane, the time interval t is a half of the time interval $t_0$. Thus, such a relation is expressed as in an equation 1. A rotation cycle in which the rotary laser device 151 rotates the fan-shaped beams is T.

$$t_0 = 2t \tag{1}$$

When the light receiving section 156 is in the position B above the horizontal plane, the time delay between the two detections is shorter than a half of to as illustrated in FIG. 13(b). The time interval t becomes shorter as the light receiving section 156 is raised higher from the horizontal plane, and it can be obtained from an angle ∠BCA=γ between the straight line joining the position B of the light receiving section 156 and an emission point C of the fan-shaped beams and the horizontal plane, namely, a vertical elevation or depression angle can be obtained from the time interval between the detections by an equation 2 as follows.

$$\gamma = \delta\left(1 - \frac{2t}{t_0}\right)\tan\theta \tag{2}$$

When the light receiving section 156 is below the horizontal plane, the time interval t is longer than a half of the time interval $t_0$. In this way, it can be distinguished if the light receiving section 156 is above or below the horizontal plane. Additionally, the equation 2 can be applied to a case where the light receiving section 156 is below the horizontal plane.

Figure 14:
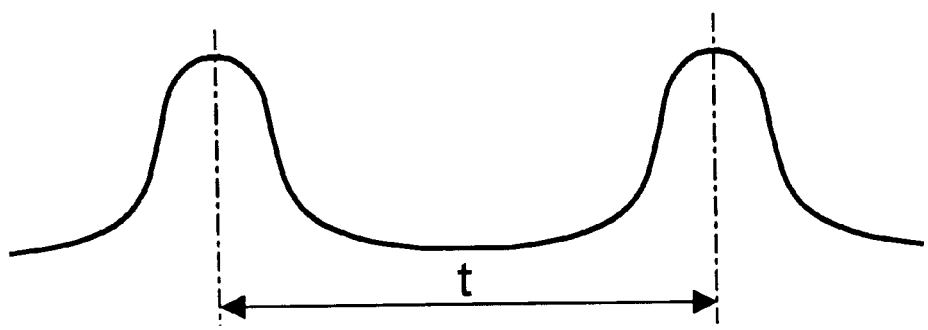
FIG. 14 is a graph showing signals detected by the light receiving and sensing device at short signal detection intervals.
Figure 14:
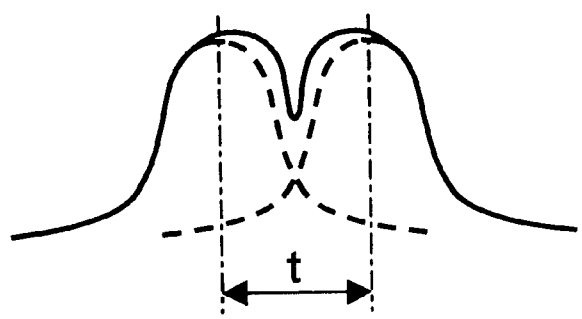
Figure 14:
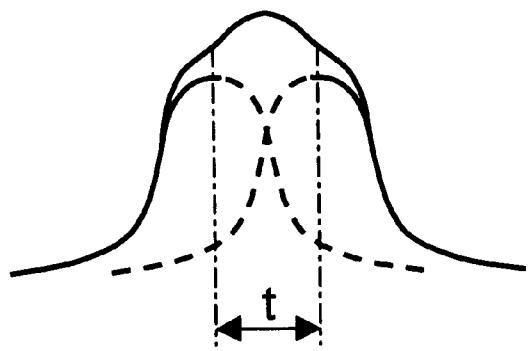

(1. 3. 1. 4) Principle of Determination for a Short Time Interval between the Detections As has been described, the light receiving and sensing device 154 measures the delayed time to and t according which three of the fan-shaped beams cross the light receiving section 156 in the light receiving and sensing device 154, respectively, and computes them to produce an angle at which the straight line joining the light receiving section 156 and the emission point C of the fan-shaped laser beams meets with the horizontal plane. When the time interval between the detections where two of the fan-shaped beams 152a and 152b are received at the light receiving section, the accurate time delay t can be determined. However, as shown in FIGS. 14(b) and 14(c), when the time interval between the detections of two of the fan-shaped beams 152a and 153 is short and signals at light receptions interfere with each other, the time interval t cannot be accurately determined. If the signals developed by two of the fan-shaped beams 152a and 153 can be distinguished from one another from polarization patterns, those signals can be detected distinguishably and separately, and hence, even when the time interval t between two light receptions is short, the time delay t can be determined accurately.

(1. 3. 2) Light Receiving and Sensing Device for the Rotary Laser Device Emitting Fan-shaped Beams of Laser Light of Different Polarizations The light receiving and sensing device 154a will now be described which receives fan-shaped laser beams 152c, 152d, 153a emitted by the rotary laser device 151a and varied in polarization from one another. Specifically, a configuration of part provided to distinguish the laser beams of different polarizations will be explained herein. Configurations and determination principles of the remaining part are the same as those in the light receiving and sensing device 154.

Figure 15:
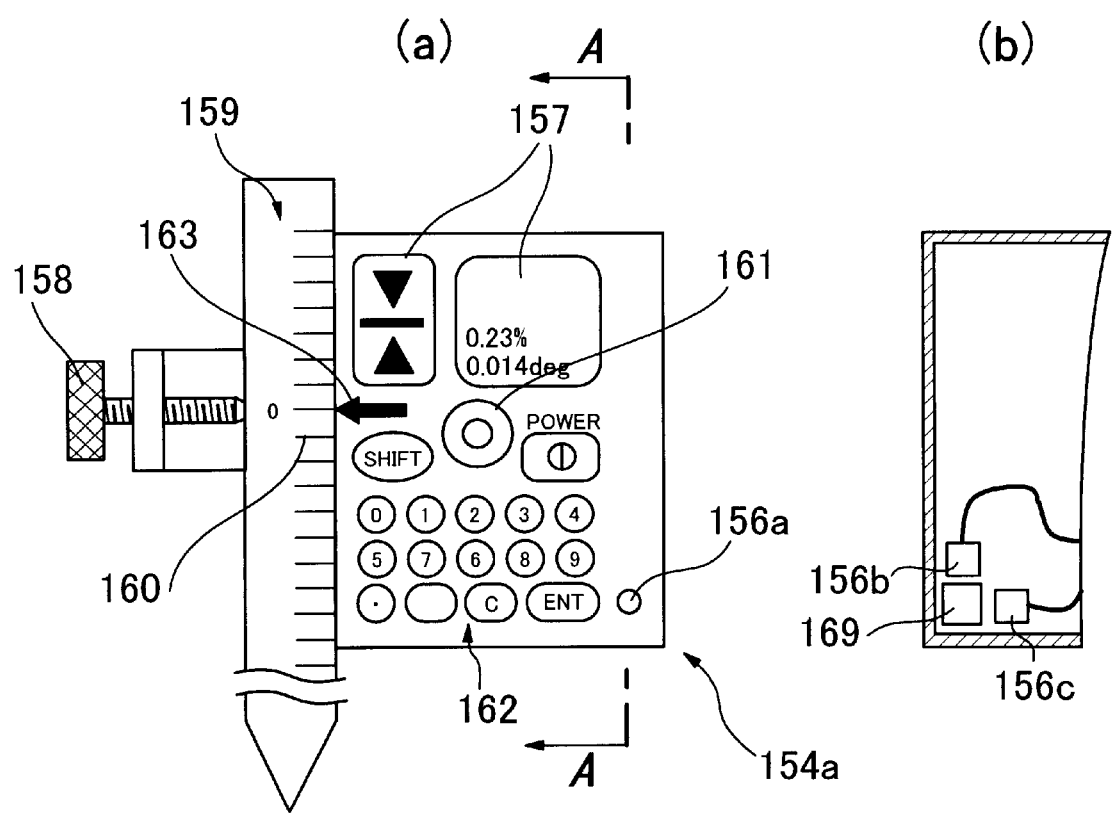
FIG. 15 is a diagram showing a light receiving and sensing device for receiving fan-shaped beams different in polarization from one another.

As depicted in FIG. 15(a) and FIG. 15(b) containing a sectional view taken along the line A—A in FIG. 15(a), the light receiving section 156a of the light receiving and sensing device 154a has light receiving elements 156b and 156c and a polarized-beam splitter 169 provided right in front of each of the light receiving elements. The polarized-beam splitter 169 transmits or reflects laser beam depending upon a polarization direction upon entrance of the laser beam. The light receiving element 156b is provided for reflected beams while the light receiving element 156c is provided for transmitted beams, and in this way, the direction of polarization of the incident laser beam can be distinguished. If two of the fan-shaped beams 152c and 153a are incident upon the light receiving section 156a with a short dime delay, the light receiving element 156b detects the fan-shaped beam 152c while the light receiving element 156c detects the fan-shaped beam 153a, respectively, and thus, the time delay or interval can be accurately detected. Similarly, the light receiving section 156a can distinguish the fan-shaped beam 153a from the fan-shaped beam 152d.

(1. 3. 3) Determination of Rotational Angular Position of the Light Receiving and Sensing Device Relative to the Rotary Laser Device The light receiving and sensing device 154 has an angular signal receiving unit 170 (see FIG. 12) that successively receives data on emission angles forwarded by the angle signal transmitter 123 (see FIG. 3) provided in the rotary laser device 151. The emission angle data received at the very instance when the light receiving and sensing device 154 has received the fan-shaped beam 153 is utilized to determine a rotational angular position of the light receiving and sensing device 154 relative to the rotary laser device 151. Such a manner of determining the rotational angular position by the angle signal receiving unit 170 can totally similarly be applied to the light receiving and sensing device 154a (see FIG. 15) that receives two of the fan-shaped beams varied in polarization from each other.

Figure 10:
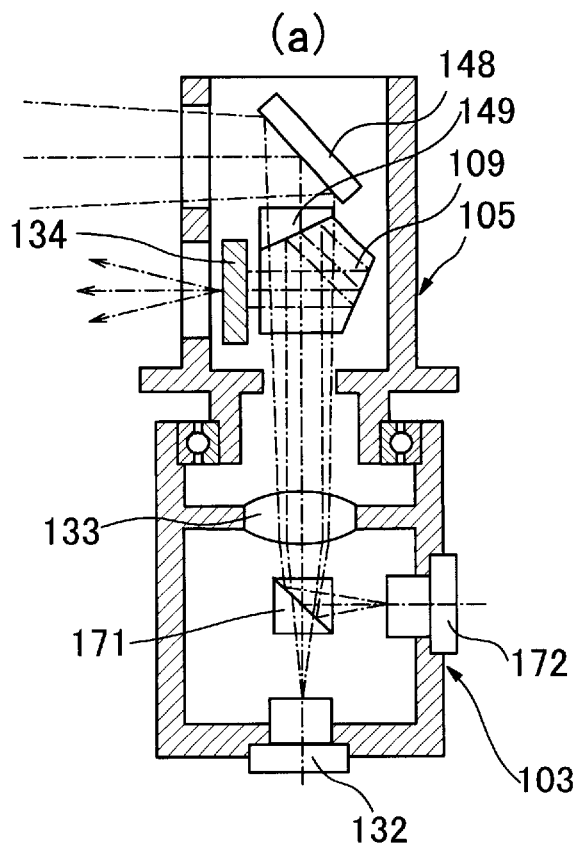
FIG. 10 is a sectional view showing an embodiment of a rotary laser device that utilizes laser beam to transmit data on rotational angular positions.
Figure 10:
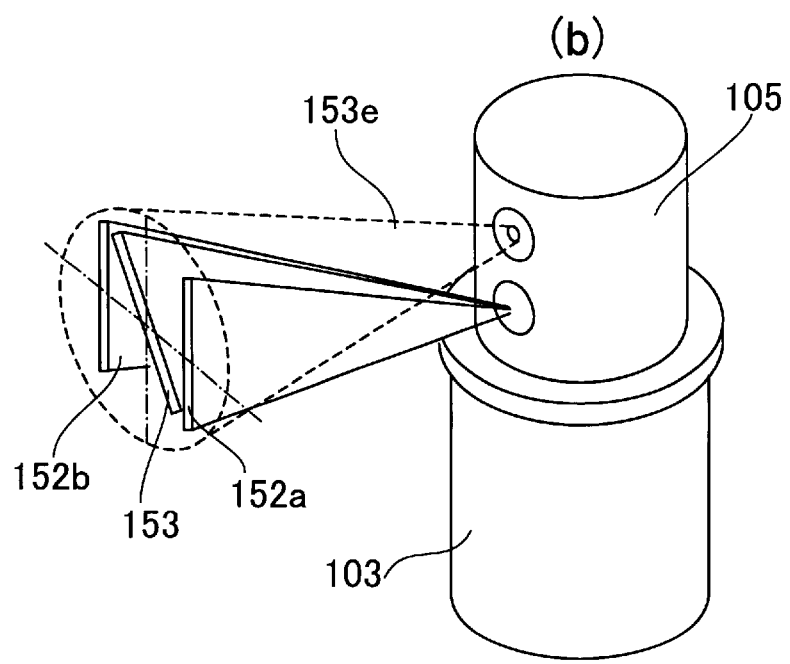
Figure 16:
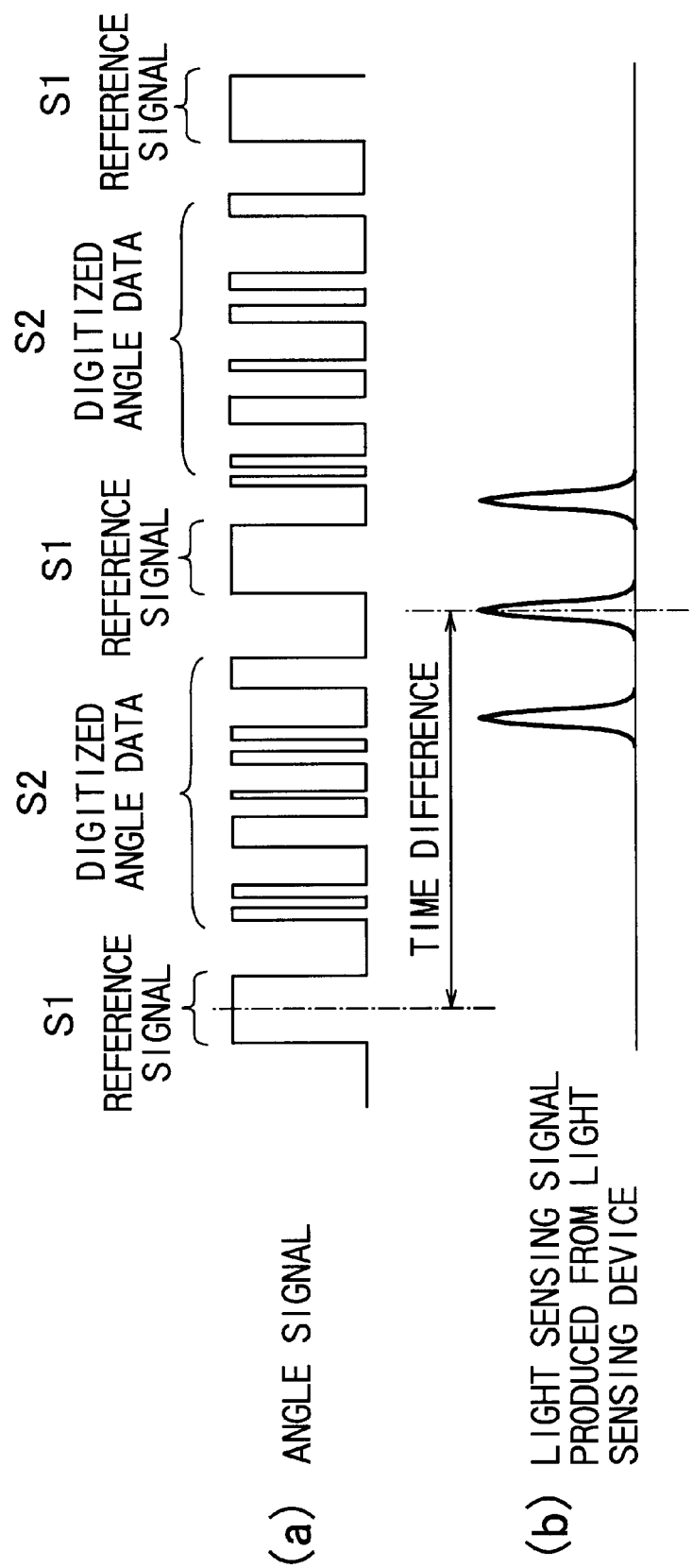
FIG. 16 is a graph showing examples of laser light that carry rotational angular position signals.

An alternative embodiment shown in FIG. 10 will be described which transmits laser light representing a rotational angular signal. The angle signal projector 172 emits laser light different in color (wavelength) from the fan-shaped beams 152a, 152b, and 153, and thereafter, the laser light is made come up and out in a pattern as illustrated in signal (a) of FIG. 16, for example, to transmit the rotational angular position. A signal (a) shown in FIG. 16 is composed of a reference signal Si and a digitized signal S2 that comes up and out in a digitally coded pattern for the rotational angular position. The reference signal S1 is emitted with the same time of delay while the digitized signal S2 comes up and out in the digitally coded pattern between two of the reference signals. Digitized codes of the pattern are digital codes of the rotational angular position determined by the encoder 117 (see FIG. 3).

Figure 17:
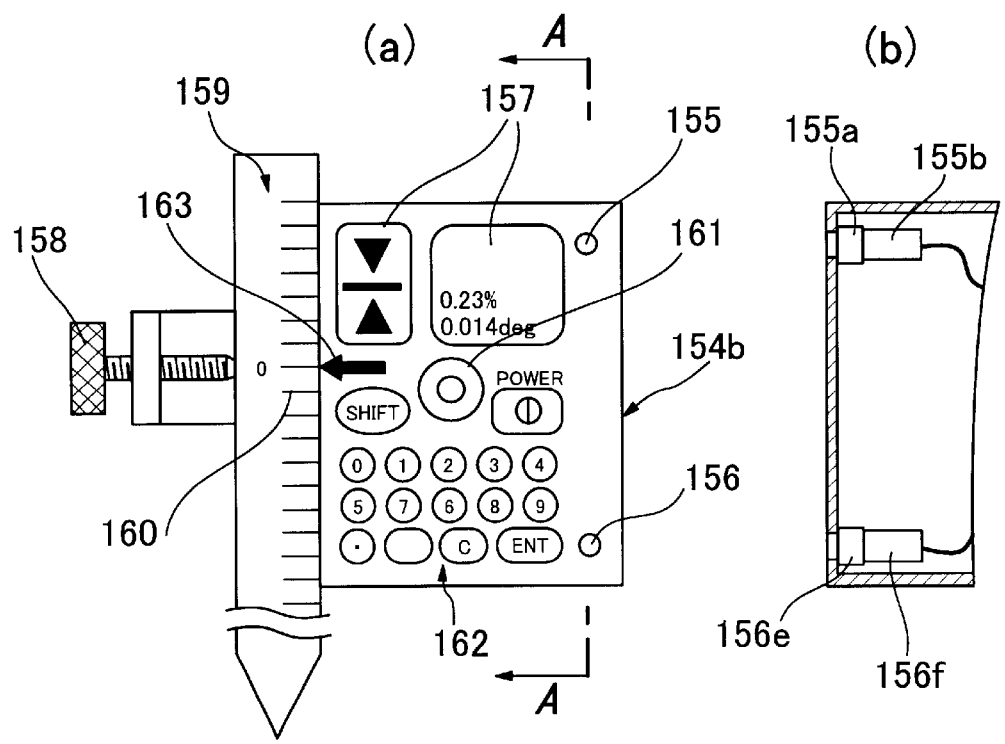
FIG. 17 is a diagram showing a light receiving and sensing device having a light receiving section at which a rotational angular signal are received.

FIG. 17(a) and FIG. 17(b) sectioned along the line A-A in FIG. 17(a) illustrate the light receiving and sensing device 154b used in combination with this embodiment of the rotary laser device. Hereinafter, determination of a rotational angular position by the light receiving and sensing device 154b will be explained. Configurations of the remaining part are the same as those in the light receiving and sensing device 154.

The light receiving and sensing device 154b has an angular data receiving unit 155 used to receive a signal representing the rotational angular position that is emitted from the rotary laser device. The angular data receiving unit 155 has a color filter 155a and a light receiving element 155b. The color filter 155a is positioned right in front of the light receiving element 155b, and the light receiving element 155b receives only laser light representing angular data so as not to be affected by the fan-shaped beams 152a, 152b, and 153. The light receiving section 155d used to receive the fan-shaped beams has a color filter 156e positioned right in front of a light receiving element 156f so as to receive only the fan-shaped beams 152a, 152b, and 153 without influence by the laser light representing the angular data.

After receiving the signal representing the rotational angular position, the light receiving and sensing device 154b computes the rotational angular position based upon its digitized signal. The rotational angular position merely shows a rough value since the digitized signal S2 is transmitted at certain intervals. Thus, as shown in signal (b) of FIG. 16, a time difference between an instance of reception of the fan-shaped beam 153 and an instance of reception of the reference signal S1 is utilized to interpolate datum on rotational angular positions at intervals and determine a more accurate angle.

Figure 18:
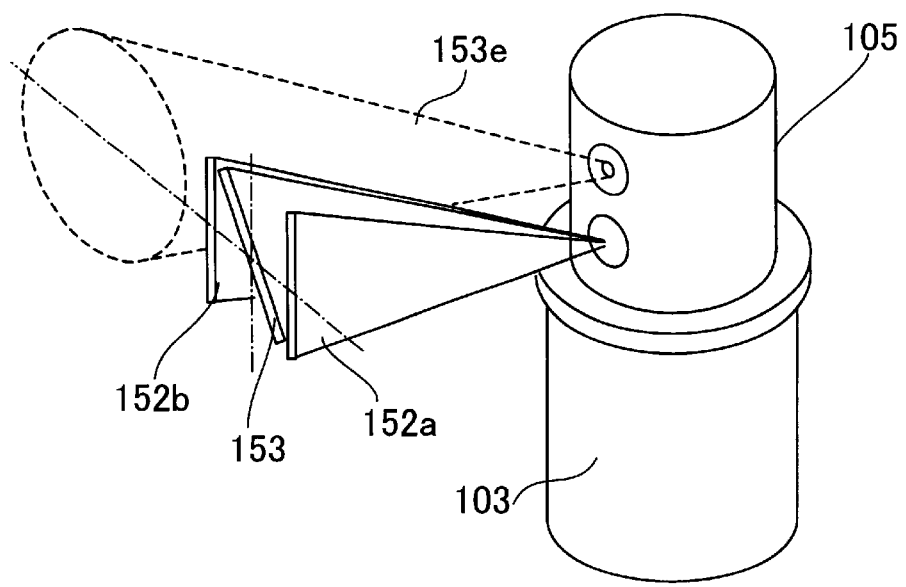
FIG. 18 is a perspective view showing directions of emitted laser fan-shaped beams and laser light that carries the rotational angular signal.

Three of the fan-shaped beams and the laser light emitted by the angle signal projector 172 do not always have to be received at the same time. Thus, as shown in FIG. 18, alternative configuration may be used to make the rotary laser device emit the fan-shaped beams 152a, 152b, and 153 and the laser light from the angle signal projector 172 in directions varied from one another. In such a case, a time difference between an instance of reception of the fan-shaped beam 153 and an instance of reception of the angular data is utilized to compute an angle. With such a configuration, the fan-shaped beams 152a, 152b, and 153 and the laser light emitted from the angle signal projector 172 may be the same in color (wavelength), and thus, the light receiving section for the fan-shaped beams may also be substituted for the light receiving element for the angular data, or vice versa.

Moreover, the laser light carrying the angular data must be diverged or converged to cover the entire range at which positional determination can be permitted by using the fan-shaped beams 152a, 152b, and 153.

Figure 19:
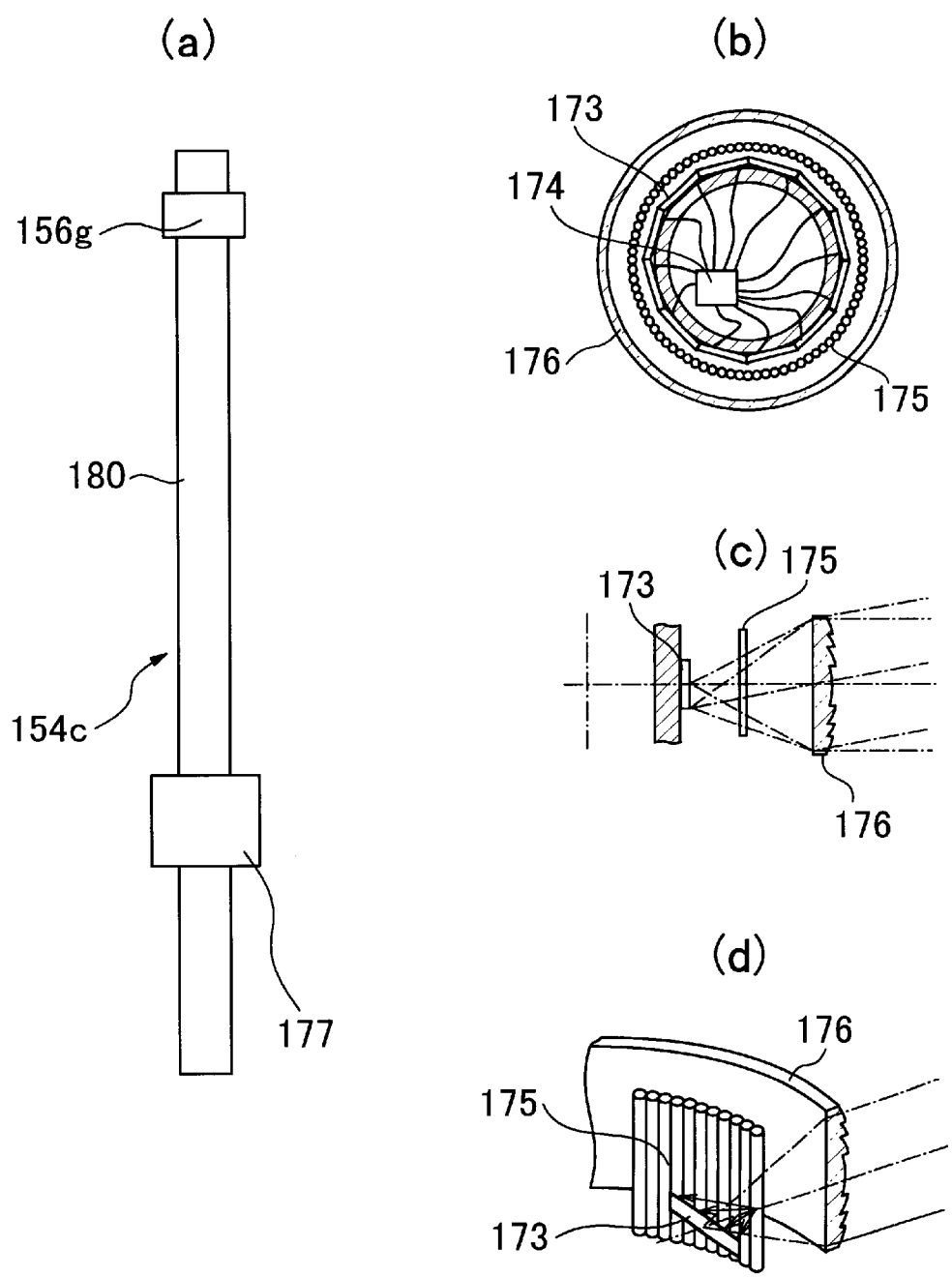
FIG. 19 is a diagram showing an embodiment of the light receiving and sensing device that has an omni-directional light receiving feature.
Figure 20:
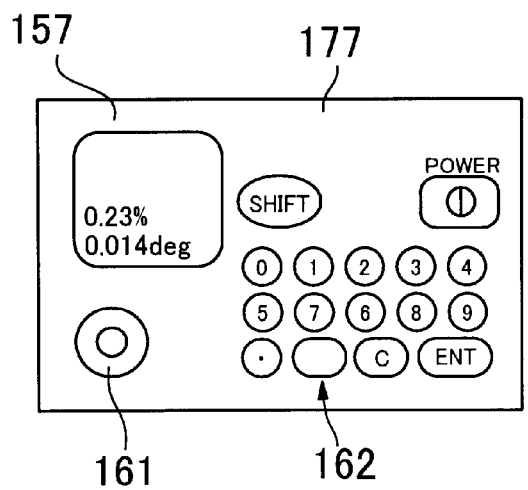
FIG. 20 is a diagram showing a light receiving and sensing controller incorporated in the light receiving and sensing device in FIG. 19.
Figure 20:
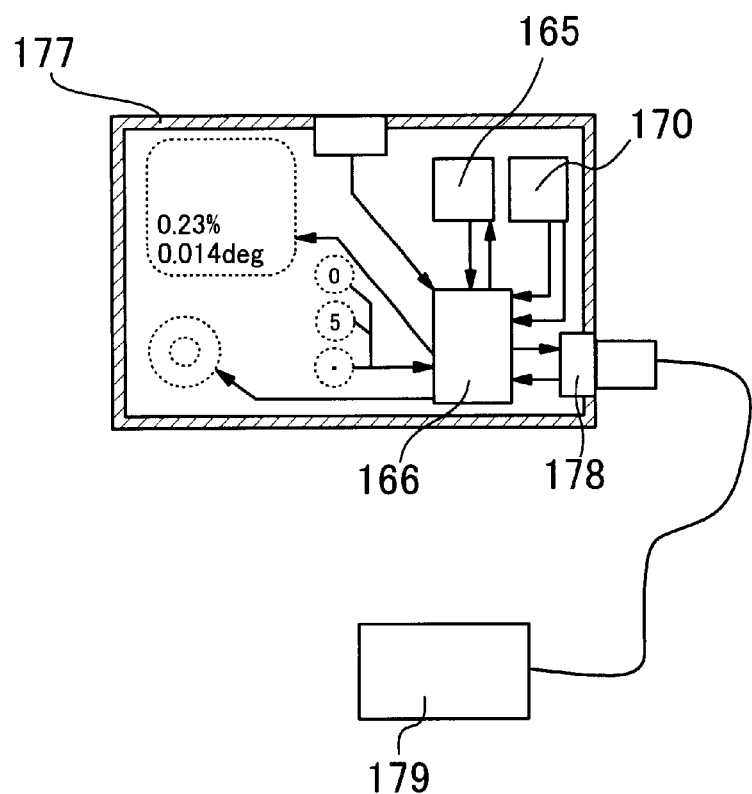

(1. 3. 4) Light Receiving and Sensing Device Having a Light Receiving Section Capable of Receiving Light in an Omni-directional Manner FIG. 19 shows an embodiment of the light receiving and sensing device 154c that is capable of receiving light in an omni-directional manner. As shown in FIG. 19, the omni-directional light receiving and sensing device 154c has a supporting rod 180, a light receiving section 156g, and a sensor controller 177. The light receiving section 156g is mounted on top of the supporting rod 180 while the sensor controller 177 is attached to a lower portion of the supporting rod. The light receiving section 156g has an annular cylindrical Fresnel lens 176, an annular fiber sheet 175, and a plurality of light receiving elements 173 disposed in an annular form, and these components are deployed in a concentric form. In addition to that, a light receiving element controller 174 is surrounded by the light receiving elements 173 annularly disposed. As depicted in FIG. 20(a) and FIG. 20(b) which is a sectional view of FIG. 20(a), the sensor controller 177 includes a display 157, a warning element 161 such as a buzzer, input keys 162, a memory 165, a computation unit 166, an angle signal receiver 179, and an external communication unit 178. Furthermore, the sensor controller 177 can be connected to an external computer 179 through the external communication unit 178. The external computer 179 can be used to process data entry, display of the determination results, and subsequent treatment of the determination results.

When the light receiving section 156g is irradiated with the fan-shaped beams, the laser light is converged toward the light receiving elements 173 the cylindrical Fresnel lens 176 having a directivity toward elevating and depressing directions with the fiber sheet 175 intervening therebetween. The fiber sheet 175 diffuses in horizontal direction the fan-shaped beams converged by the cylindrical Fresnel lens 176, and hence, the received fan-shaped beams are uniformly incident upon the light receiving elements 173. With such a configuration, any rays scattered out beyond the directivity of the cylindrical Fresnel lens 176 are not incident upon the light receiving elements 173, and therefore, an S/N ratio of a reception signal developed by the incident fan-shaped beams. The light receiving elements 173 judges a state of receiving light and breaks a circuit of the light receiving element 173 at which the fan-shaped beams are directed to further enhance the S/N ratio of the incident signal.

When the light receiving element 173 receives laser light, the light reception signal is sent to the light receiving element controller 174. The light receiving element controller 174 built in the light receiving section 156g sends the light reception signal to the light receiving and sensing controller 177. Signal processing in the light receiving and sensing controller 177 is similar to that in the light receiving and sensing device 154.

Figure 21:
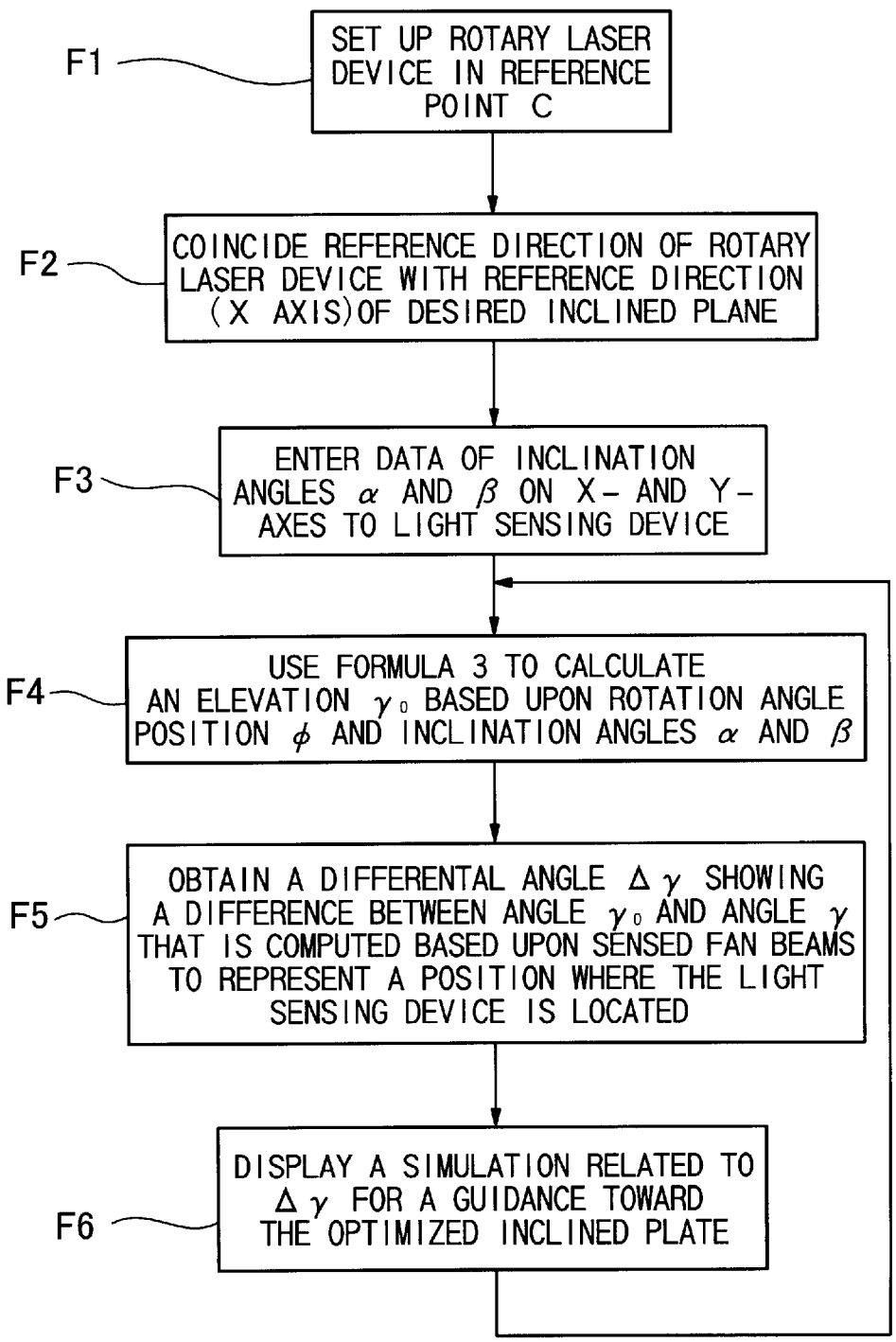
FIG. 21 is a flow chart illustrating procedural steps of an embodiment of the position determining system according to the present invention.
Figure 22:
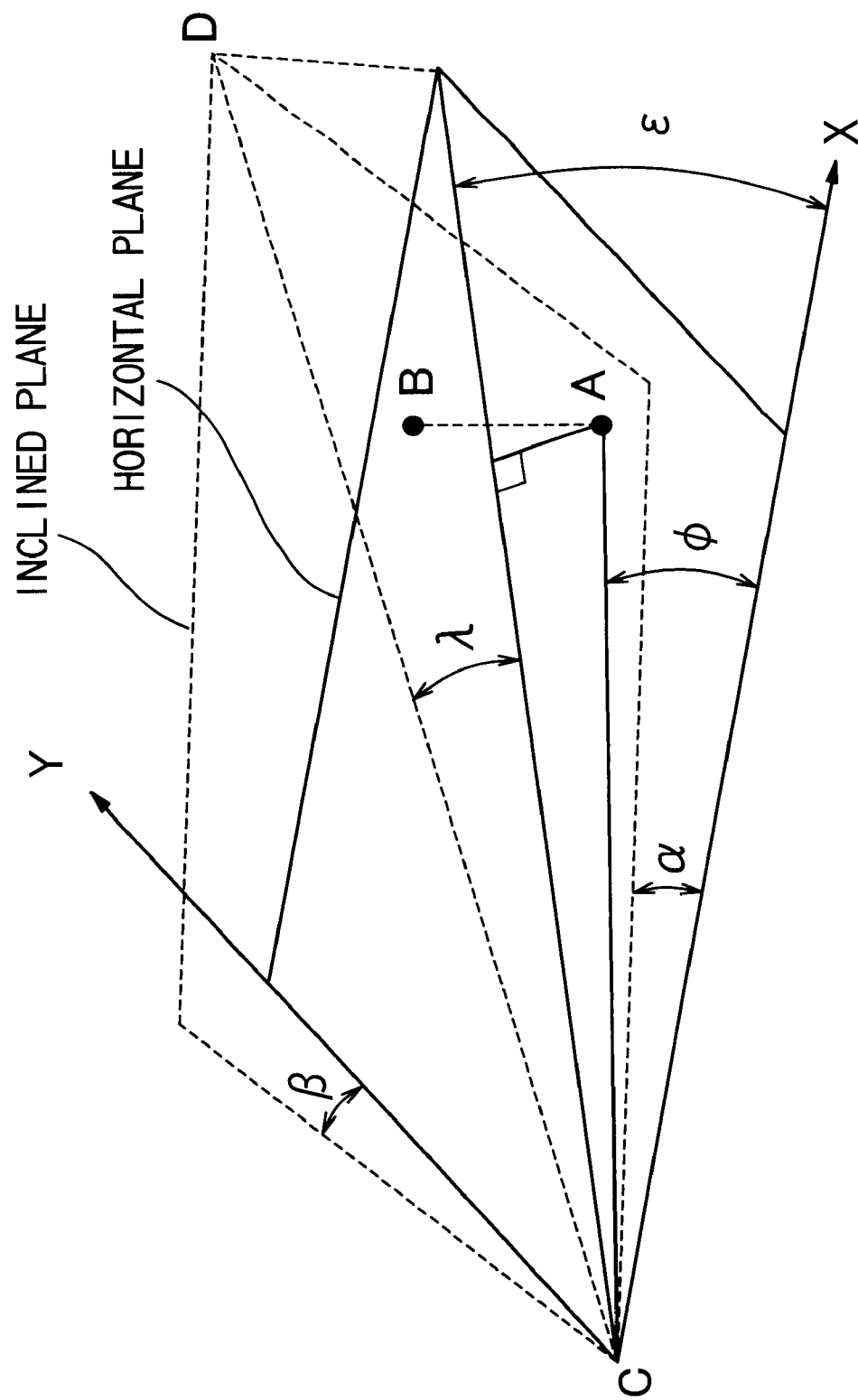
FIG. 22 is a diagram showing a relation of simulated inclined planes with coordinate axes.

(1. 4) Operation of the Position Determining System (1. 4. 1) An exemplary operation of the position determining system in combination with the rotary laser device 151 and the light receiving and sensing device 154 will now be described. FIG. 21 is a flow chart of an operational procedure according to which the position determining system produces phantom planes or inclined planes. FIG. 22 is a diagram showing positional relations of the horizontal plane, the inclined planes to be produced, and the coordinate axes. A case is explained in which an inclined plane (2-axially beveled plane) is to be produced so as to cross a reference point C, tilting at angle $\alpha$ in an X-axis direction, and tilting at angle $\beta$ in a Y-axis direction. The inclined plane has its inclination (bevel angle) maximized when measured in a direction of straight line CD, and the angle is denoted $\lambda$.

At step F1, the rotary laser device 151 is placed so that the fan-shaped beams 152a, 152b, and 153 rotate about a vertical axis joining the point C. Then, at step F2, a reference direction of the rotary laser device 151 is set up to be identical with a reference direction (X-axis direction herein) of the inclined plane to be produced. The "reference direction" of the rotary laser device 151 is a direction in which the encoder incorporated in the rotary laser device 151 produces an angle of zero degree for a direction of emitted fan-shaped beam. The reference direction of the inclined plane is optionally determined as desired by an operator.

In an alternative manner of the step F2, the rotary laser device 151 is placed in an arbitrary direction while the light receiving and sensing device 154 is placed along an extension in the reference direction of the inclined plane (on the X-axis), so as to determine the rotational angular position of the light receiving and sensing device 154. Then, the determined angle may be used as an offset angle to numerically subtract it from the angle of laser emission by the rotary laser device 151 to adjust the angle of the fan-shaped beam when the fan-shaped beam is emitted along the X-axis.

At step F3, a desired inclination angle $\alpha$ of the inclined plane to be produced in the reference direction (X-axis direction) and a desired inclination angle $\beta$ in a direction orthogonal to the reference direction (Y-axis direction) are entered on the input keys 162 in the light receiving and sensing device 154. The reference point C and the inclination angles $\alpha$ and $\beta$ thus entered allow the inclined plane to be completely defined. In general, the inclination angle of the inclined plane varies depending upon which direction the inclination angle is determined from the reference point C or an original point. Assuming the inclination angle of the inclined plane is determined in an arbitrary direction such as a direction with which the X-axis meets at an angle $\phi$, the inclination angle $\gamma_0$ (elevating or depressing angle) can be computed based upon an equation 3 as follows.

$$\gamma_0 = \tan^{-1}(\tan \lambda \cos(\phi - \epsilon)) \quad (3)$$

where $\beta \neq 0$ and $\lambda = \sqrt{\alpha^2 + \beta^2}$ when $\alpha > 0$ and $\beta.\ 0$, $\epsilon = \tan^{-1}(\beta/\alpha)$,
when $\alpha = 0$ and $\beta.\ 0$, $\epsilon = \pi/2$,
when $\alpha < 0$ and $\beta.\ 0$, $\epsilon = \tan^{-1}(\beta/\alpha) + \pi$
when $\alpha < 0$ and $\beta.\ 0$, $\epsilon = -\tan^{-1}(\beta/\alpha) - \pi$
when $\alpha = 0$ and $\beta < 0$, $\epsilon = -\pi/2$
when $\alpha > 0$ and $\beta.\ 0$, $\epsilon = \tan^{31\ 1}(\beta/\alpha)$ At step F4, the angle signal receiver 170 in the light receiving and sensing device 154 receives a signal transmitted from the angle signal transmitter 123 in the rotary laser device 151 to determine which rotational and angular position relative to the reference point C the light receiving and sensing device 154 is positioned. Then, the computing unit 166 of the light receiving and sensing device 154 computes the inclination angle $\gamma_0$ of the inclined plane that is determined in a direction corresponding to the obtained rotational angular position. For example, when the light receiving and sensing device 154 is placed in a point A in a rotational angular position making an angle $\phi$ relative to the reference point C (the point A is in the horizontal plane), the inclination angle $\gamma_0$ of the inclined plane determined in a direction making an angle $\phi$ is an angle $\angle BCA$ at which the horizontal plane meets with a straight line joining a point B vertically right above the point A in the inclined plane and the reference point C, and the inclination angle $\gamma_0$, can be obtained based upon the equation 3. The angle $\phi$ is referred to as a rotational angular position in this specification.

At step F5, the computation unit 166 of the light receiving and sensing device 154 uses the equation 2 together with the time delays t and $t_0$ between detections of the three fan-shaped beams 152a, 152b, and 153 emitted by the rotary laser device 151 to compute the elevating or depressing angle $\gamma$ for the position where the light receiving and sensing device is currently located, and the resultant value is indicated on the display 157. The rotational angular position f of the light receiving and sensing device 154 also appears on the display 157. After that, the elevating or depressing angle $\gamma$ is compared with the inclination angle $\gamma_0$ to compute an angular difference $\Delta\gamma$ between them. The light receiving and sensing device 154 may be configured so that the angles such as the elevating or depressing angle $\gamma$ can be converted and displayed in desired units such as "rad (radian)", "deg (angle)", "% (bevel angle)", and so forth.

At step F6, the display 157 in the light receiving and sensing device 154 indicates, on the basis of the angle $\Delta\gamma$ computed at the step F5, the simulation results on which way the light receiving and sensing device 154 must be moved upward or downward to be in a closer position to the desired inclined plane. An operator or user moves the light receiving and sensing device 154 upward or downward, referring to the indication on the display 157. A displacement of the light receiving and sensing device 154 can be read with the index 163 and the level rod 159 attached in the light receiving and sensing device. Alternatively, the displacement may be read by a level rod scale reader 167 to send the reading results to the computing unit 166.

Procedures in the steps F4 and F6 are automatically repeated till the light receiving and sensing device 154 is placed on the inclined planes to be produced. Preferably, the light receiving and sensing device 154 has the buzzer 161 that rings when the light receiving and sensing device is located on the desired inclined plane to be produced.

(1. 4. 2) Other functional features of the position determining system will be described. The above-mentioned operation is attained by the operator's setting the desired inclined plane and then by using the position determining system according to the present invention to produce the inclined plane. In contrast, one of functional feature described hereinafter uses the position determining system according to the present invention to determine an inclination angle at an arbitrary position where the light receiving and sending device 154 is located. Specifically, the rotary laser device 151 is placed in the reference point C, and the light receiving and sensing device 154 is located in a position that is to be determined. Then, the rotary laser device 151 is actuated to emit the fan-shaped beams 152a, 152b, and 153 so that the light receiving and sensing device 154 receives the fan-shaped beams, and thus, an elevating or depressing angle can be determined as to a position where the light receiving and sensing device 154 is located.

As desired, an inclined plane can be automatically produced where a straight line joining the reference point C and the light receiving and sensing device 154 arbitrarily located makes a maximum inclination angle. Specifically, referring to FIG. 22, the rotary laser device 151 is placed so that the reference direction is superposed with the X-axis, and thereafter, the light receiving and sensing device 154 is placed at an arbitrary point D. The rotary laser device 151 is actuated to determine an elevating or depressing angle $\lambda$ at the point D. The computation unit 166 of the light receiving and sensing device 154 computes inclination angles $\alpha$ and $\beta$ in the X- and Y-axis directions of the inclined plane that has a maximum inclination angle identical with a straight line CD. The computation results of the inclined angles $\alpha$ and $\beta$ are indicated on the display 157 in the light receiving and sensing device 154 to determine an inclined plane defined by the inclination angles $\alpha$ and $\beta$. Thus, the inclined plane determined in this way can be produced in an arbitrary position. The light receiving and sensing device 154 may have a buzzer that rings when the light receiving and sensing device is located on the inclined plane.

In an alternative embodiment of the position determining system according to the present invention, a single unit of the rotary laser device 151 may be combined with a plurality of the light receiving and sensing devices 154 to independently use each light receiving and sensing device 154. In the prior art inclined plane determining system, two of the rotary laser devices are necessary to produce two types of different inclined planes, and there arises a problem that laser beams emitted respectively by the rotary laser devices interfere with each other to cause malfunction. However, in the alternative embodiment of the position determining system according to the present invention, the plurality of the light receiving and sensing devices 154 can work on the single rotary laser device 151, and the resultant inclined planes are different from one another and respectively unique to those light receiving and sensing devices 154.

With such an improvement, when the light receiving and sensing devices 154 are attached to construction machines to level the ground, a plurality of the construction machines can simultaneously work cooperative with only one rotary laser device 151, and moreover, the construction machines can respectively dedicate themselves for inclined surfaces varied one from another. When the inclined plane determined according to the procedure as mentioned above is to be altered, such predetermined settings can be varied for each light receiving and sensing device. Therefore, there is no need of interrupting an operation of the rotary laser device for setting change, and also there is no need of interrupting an operation of any light receiving and sensing device that undergoes no setting change.

Figure 23:
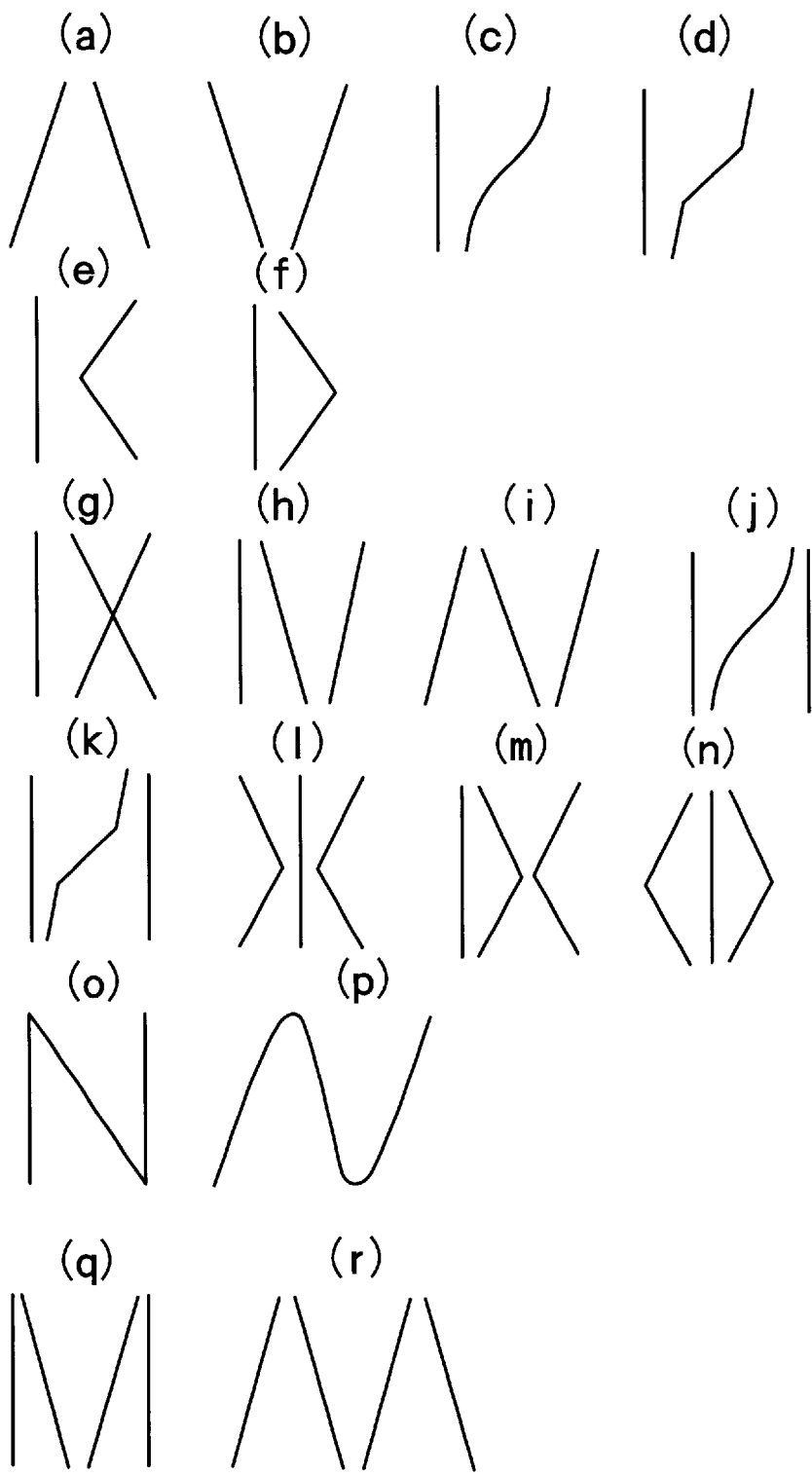
FIG. 23 is a diagram showing various exemplary pattern of emitted fan-shaped beams.
Figure 24:
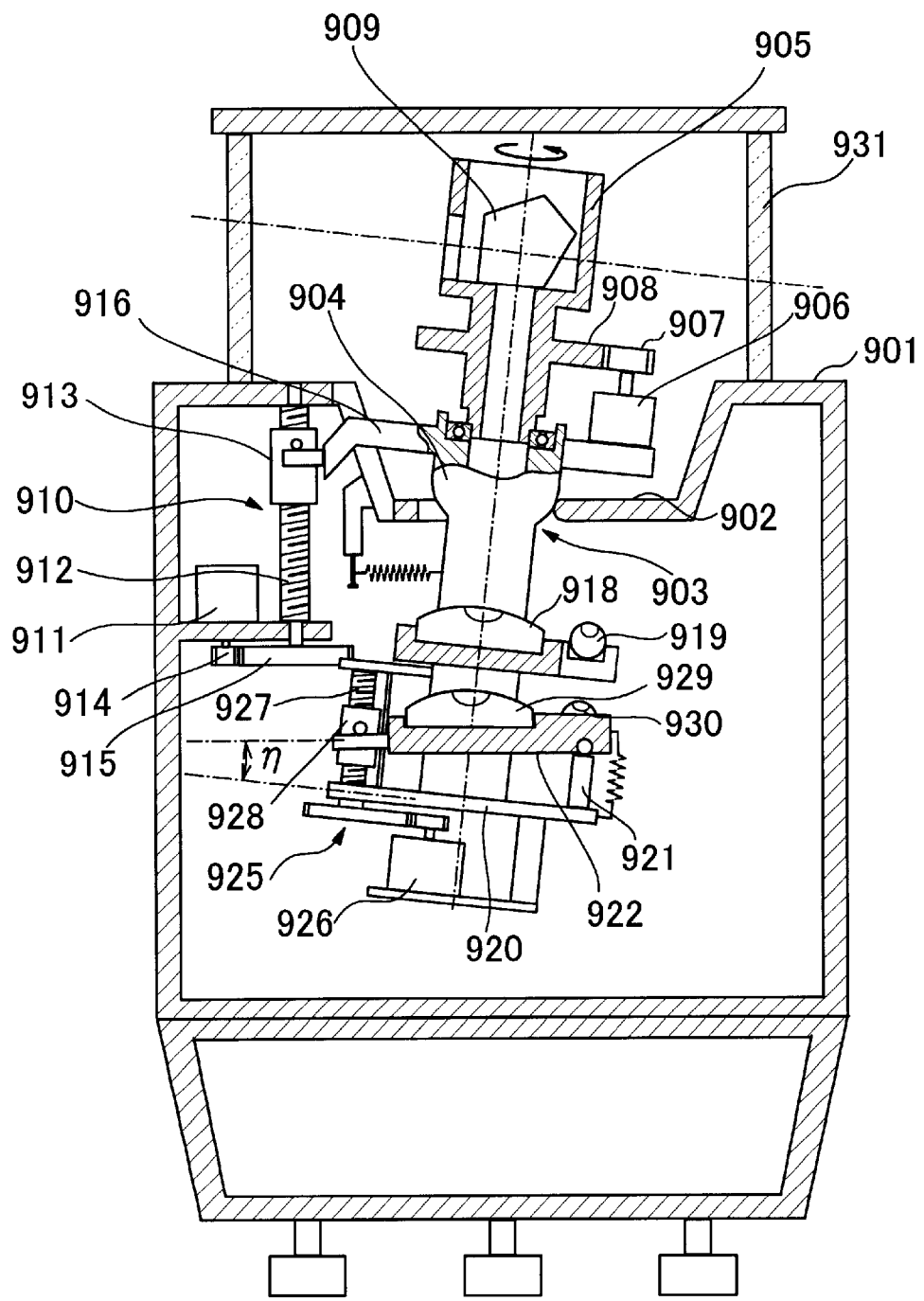
FIG. 24 is a sectional view showing the prior art example of the rotary laser device.

(2) Other Preferred Embodiments
(2. 1) Other Embodiments of the Fan-shaped Beams Although the embodiments as mentioned above are configured so that the rotary laser device 151 emits three of the fan-shaped laser beams 152a, 152b, and 153 together making a generally N-shaped irradiation pattern as shown in FIG. 2, the number of the emitted laser beams may be more or less than three, and the irradiation pattern of the laser beams may be varied as desired. Examples of the irradiation pattern of the fan-shaped laser beams are shown in FIGS. 23(a) to 23(r). These patterns of the fan-shaped laser beams can be easily implemented by appropriately changing the diffraction grating in FIG. 5.

As with the irradiation patterns of the fan-shaped laser beams as shown in FIGS. 23(q) to 23(j), the light receiving section 156 of the light receiving and sensing device 154 detects the fan-shaped laser beams three times for a duration of one revolving movement of the rotary laser device 151. Thus, the elevating or depressing angle $\gamma$ can be computed in a similar manner as in the aforementioned embodiment 1.

As to the irradiation patterns of the fan-shaped laser beams as shown in FIGS. 23(q) to 23(r), the fan-shaped laser beams are detected four times for a duration of one revolving movement of the rotary laser device 151. Thus, arbitrarily selecting three out of the detected four fan-shaped beams and computing to obtain the elevating or depressing angle $\gamma$ permits 4 variations of $\gamma$ to be produced. Averaging these results of the elevating or depressing angle permits the elevating or depressing angle $\gamma$ to be determined with enhanced accuracy. The number of the fan-shaped laser beams may be increased to increase the number of samples subjected to the averaging, in order to further enhance the determination accuracy.

As for the irradiation patterns of the fan-shaped laser beams as shown in FIGS. 23(a) to 23(f), the fan-shaped laser beams are detected only twice for a duration of one revolving motion of the rotary laser device 151, and therefore, the elevating or depressing angle $\gamma$ cannot be computed in the above-mentioned way. For example, employing the irradiation pattern of the fan-shaped laser beams in FIG. 23(b), the elevating or depressing angle $\gamma$ can be computed by using an equation 4 as follows.

$$\gamma = \frac{(t - t_0)\pi\tan(\xi)}{T} \tag{4}$$

where T is a rotation cycle of the rotary laser device, $\xi$ is an inclination angle of the fan-shaped laser beams relative to the horizontal plane, $t_p$ is a time delay between receptions of the fan-shaped laser beams when the light receiving and sensing device 154 is placed on the horizontal plane, and t is a time delay between receptions of the fan-shaped laser beams when the light receiving and sensing device 154 is located in a position of the determination.

Since an equation 4 contains a term of the rotation cycle T of the rotary laser device, irregularity of the rotations by the fan-shaped laser beams influence the accuracy at which the elevating or depressing angle $\gamma$ is determined. In these embodiments, for the motor that causes the fan-shaped laser beams to rotate, a motor of high revolution accuracy such as a spindle motor is preferably used. On the contrary, since the equation 2 has no term of the rotation cycle T, the determination accuracy is not varied unless irregularity of the rotations by the fan-shaped laser beams exists during a short period of time from a reception of the fan-shaped beam 152a to a reception of the fan-shaped beam 152b. Thus, it is recognized that there is a reduced influence of errors caused by such irregularity of the beam rotations in the embodiment where the fan-shaped beams are detected three times during one revolution of the rotary laser device 151, compared with the embodiment where the fan-shaped beams are detected twice for the same duration.

The fan-shaped laser beams of the patterns in FIGS. 23(c), 23(d), 23(j), and 23(k) assume a moderate inclination in the vicinity of the horizontal plane while assuming a sharp inclination in a section apart from the horizontal plane, and hence, a rate of a variation in the elevating or depressing angle γ to a variation in the time delay between the light receptions varies from a section close to the horizontal plane to a section apart from the horizontal plane. In this way, a sensitivity in determining the elevating or depressing angle in the vicinity of the horizontal plane can be enhanced.

(2. 2) Other Uses of the Light Receiving and Sensing Device

As has been described, the light receiving and sensing device used in the preferred embodiments of the position determining system according to the present invention may be combined with not only a rotary laser device but also any other laser beam emitting device.

The present invention can be applied in various manners as mentioned below.

[1] An alternative embodiment of the position determining system includes
- a first device having a means for transmitting data on vertical angles and a means for transmitting data on rotational angular positions, and
- a second device having a means for determining inclined planes, a means for determining the vertical angles from the data transmitted from the first device, and a means for displaying an angular difference between the vertical angles determined by the vertical angle determining means and the elevation- and depression-angles of the inclined planes determined by the inclined planes determining means.

[2] In the position determining system as defined in [1], the first device is a rotary laser device that includes a means for determining rotational angular positions, and a means for transmitting the rotational angular positions determined by the determining means, where the rotary laser device emits at least two fan-shaped beams of laser light having divergence within planes other than the horizontal plane while rotating the fan-shaped laser beams about a predetermined axis,
- the second device has a means for receiving the rotational angular positions transmitted by the rotational angular position transmitting means, and a means for receiving the fan-shaped laser beams, and
- at least one of inclination angles of the fan-shaped laser beams is different from the remaining inclination angles of the fan-shaped laser beams, the light receiving and sensing device determines the vertical angles of the light receiving and sensing device relative to the rotary laser device based upon a state of light receptions in the light receiving section that has received the fan-shaped laser beam, and the light receiving and sensing device determines the rotational angular positions of the light receiving and sensing device relative to the rotary laser device based upon the rotational angular positions received from the rotary laser device.

[3] In the position determining system as defined in [2], the light receiving and sensing device further has a function to determine inclined planes to be produced,
- the light receiving and sensing device displays a deviation of its location from the inclined plane, and/or, the light receiving and sensing device gives a warning display to announce that the light receiving and sensing device is placed on the inclined plane.

[4] In the position determining system as defined in [2] or [3], the means for determining the rotational angular position is an encoder.

[5] In the position determining system as defined in any one of [2] to [4], the means for transmitting the rotational angular positions is light or laser light.

[6] In the position determining system as defined in any one of [2] to [4], the means for transmitting the rotational angular positions is wave.

[7] In the position determining system as defined in [5], both the fan-shaped beams of laser light and the light or laser light carrying data on the rotational angular positions are received at the same light receiving section in the light receiving and sensing device.

[8] In the position determining system as defined in any one of [2] to [7], the light receiving section in the light receiving and sensing device is provided with a compressing or converging means.

[9] In the position determining system as defined in [8], the compressing or converging means is a lens.

[10] In the position determining system as defined in any one of [2] to [9], the rotational laser device emits three fan-shaped beams of laser light in fan-shaped irradiation pattern.

[11] In the position determining system as defined in any one of [2] to [9], the light receiving section in the light receiving and sensing device detects the fan-shaped laser beams three times or more for a duration of one revolving motion of the rotary laser device.

[12] A light receiving and sensing device includes a means for receiving data on rotational angular positions transmitted from a rotary laser device, and a light receiving section receiving fan-shaped beams of laser light emitted by the rotary laser device,
- the rotary laser device determines vertical angles relative to the rotary laser device based upon a sate of light receptions at the light receiving section that has received the fan-shaped laser beams.

[13] In the light receiving and sensing device as defined in [12] that further functions to determine inclined planes to be produced,
- the light receiving and sensing device displays a deviation of its location from the inclined plane, and/or, the light receiving and sensing device gives a warning display to announce that the light receiving and sensing device is placed on the inclined plane.

[14] In the light receiving and sensing device as defined in [12] or [13], both the fan-shaped beams of laser light and the light carrying data on the rotational angular positions are received at the same light receiving section.

[15] In the light receiving and sensing device as defined in any one of [12] to [14], the light receiving section is provided with a condensing or converging means.

[16] In the light receiving and sensing device as defined in [15], the condensing or converging means is a lens.

Although the preferred embodiments of the present invention have been described, the disclosure can be modified in various manners without departing from the true range and spirit of the invention and without departing from equivalent technical forms as defined only in the appended claims.

What is claimed is:

1. A position determining system comprising:
   a rotary laser device including beam emission means for emitting at least three fan-shaped beams at different angles in radial directions from a center point while rotating the fan-shaped beams about the center point so as to transmit information on the angles of the fan-shaped beams relative to a vertical plane, means for detecting the direction in which the fan-shaped beams are emitted, and communication means for communicating data detected by said means for detecting the direction; and
   a light receiving and sensing device including a single receiving means for receiving the fan-shaped beams emitted by the beam emission means, means for receiving the transmitted data from the communication means, determining means for determining a phantom plane based on the received fan-shaped beams and the received data, output means for outputting differential vertical angles relative to the phantom plane.

2. A system according to claim 1, wherein said emission means emits first, second, and third fan-shaped beams, said first and second said fan-shaped beams are directed perpendicular to the plane in which said fan-shaped beams are rotated, said third fan-shaped beam is inclined relative to one of said first and second fan-shaped beams, and said determining means determines a vertical angle on the basis of the three fan-shaped beams, and determines a horizontal angle relative to a predetermined reference direction so as to determine at least one phantom plane.

3. A system according to claim 2, wherein said light receiving and sensing device includes input means for entering a desired first vertical angle and a desired second vertical angle determined in a desired first direction and a desired second direction, respectively, and wherein said determining means determines one associated phantom plane which is inclined at said first vertical angle in said first direction and inclined at said second vertical angle in said second direction.

4. A system according to claim 2, wherein said light receiving and sensing device includes input means for entering a desired vertical angle determined in a desired direction, and wherein said determining means determines one phantom plane having said desired vertical angle in said desired direction as the maximum vertical angle.

5. A system according to claim 1, wherein said means for detecting the direction is a rotary encoder, and the data detected by said rotary encoder are transmitted from said communication means to said light receiving and sensing device.

6. A system according to claim 5, wherein said communication means communicates the data on the angles of the fan-shaped beams optically utilizing a laser beam having a different wavelength than the fan-shaped beams, and wherein said laser beam blinks in a digitally coded pattern.

7. A system according to claim 6, wherein said light receiving and sensing device includes a light receiving section that detects both the fan-shaped beams and the laser beam utilized by said communication means.

8. A system according to claim 5, wherein said communication means communicates the data on the angles of the fan-shaped beams using radio waves rather than laser beams.

* * * * *